(«12») United States Patent
Tanaka et al.

(10) Patent No.: US 11,485,436 B2
(45) Date of Patent: Nov. 1, 2022

(54) DISMANTLING SYSTEM

(71) Applicant: KOBELCO CONSTRUCTION MACHINERY CO., LTD., Hiroshima (JP)

(72) Inventors: Kiyokazu Tanaka, Tokyo (JP); Tomofumi Okada, Tokyo (JP); Reona Takamura, Tokyo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 17/270,283

(22) PCT Filed: Aug. 21, 2019

(86) PCT No.: PCT/JP2019/032562
§ 371 (c)(1),
(2) Date: Feb. 22, 2021

(87) PCT Pub. No.: WO2020/015178
PCT Pub. Date: Mar. 5, 2020

(65) Prior Publication Data
US 2021/0179213 A1    Jun. 17, 2021

(30) Foreign Application Priority Data
Aug. 27, 2018 (JP) .............................. JP2018-158740

(51) Int. Cl.
*B62D 67/00* (2006.01)
*B25J 11/00* (2006.01)
(Continued)

(52) U.S. Cl.
CPC ................ *B62D 67/00* (2013.01); *B09B 3/00* (2013.01); *B25J 11/005* (2013.01); *B25J 13/08* (2013.01);
(Continued)

(58) Field of Classification Search
CPC ......... Y10T 29/49819; Y10T 29/49755; Y10T 29/49751; Y10T 29/49821;
(Continued)

(56) References Cited

U.S. PATENT DOCUMENTS

| 6,634,092 B1* | 10/2003 | Iwasaki | B23K 1/012 29/740 |
| 2005/0220583 A1* | 10/2005 | Lutz | B65G 65/23 414/425 |

(Continued)

FOREIGN PATENT DOCUMENTS

| CN | 101734306 A | 6/2010 |
| CN | 203318561 U | 12/2013 |

(Continued)

OTHER PUBLICATIONS

Machine Translation of JP2004202422A—Disassembling treatment controlling apparatus and program—Google Patents, pp. 1-8 (Year: 2004).*

(Continued)

*Primary Examiner* — Jermie E Cozart
(74) *Attorney, Agent, or Firm* — Oblon, McClelland, Maier & Neustadt, L.L.P.

(57) ABSTRACT

A dismantling system includes a dismantling machine including a tip attachment for dismantling an object to be dismantled, an imaging device that provides a field of view from a second viewpoint position for visually recognizing an object to be dismantled, which is different from a first viewpoint position of an operator, and a dismantling operation device that receives operation by an operator of the tip attachment for dismantling an object to be dismantled with respect to the field of view provided by the imaging device.

8 Claims, 21 Drawing Sheets

(51) Int. Cl.
    *B09B 3/00*     (2022.01)
    *B25J 13/08*     (2006.01)

(52) U.S. Cl.
    CPC .... *Y10T 29/49721* (2015.01); *Y10T 29/49751* (2015.01); *Y10T 29/49755* (2015.01); *Y10T 29/49819* (2015.01); *Y10T 29/49821* (2015.01); *Y10T 29/53548* (2015.01)

(58) Field of Classification Search
    CPC .......... Y10T 29/53548; Y10T 29/49721; B25J 13/08; B25J 19/023; B25J 11/005; B62D 67/00
    See application file for complete search history.

(56) References Cited

U.S. PATENT DOCUMENTS

| | | | | |
|---|---|---|---|---|
| 2008/0225121 | A1* | 9/2008 | Yoshida | H04N 5/247 348/E7.086 |
| 2010/0017033 | A1* | 1/2010 | Boca | B25J 13/06 700/258 |

FOREIGN PATENT DOCUMENTS

| | | | |
|---|---|---|---|
| CN | 103964343 | A | 8/2014 |
| CN | 205734803 | U | 11/2016 |
| CN | 107921642 | A | 4/2018 |
| EP | 1 574 424 | A1 | 9/2005 |
| JP | 61-207766 | A | 9/1986 |
| JP | 62-176346 | U | 11/1987 |
| JP | 11-156775 | A | 6/1999 |
| JP | 2004202422 | A * | 7/2004 |
| JP | 2004-345825 | A | 12/2004 |
| JP | 2009-35905 | A | 2/2009 |
| JP | 2017-145649 | A | 8/2017 |

OTHER PUBLICATIONS

International Search Report dated Oct. 21, 2019 in PCT/JP2019/032562 filed on Aug. 21, 2019, 2 pages.
Extended European Search Report dated Aug. 31, 2021 in European Patent Application No. 19855403.2, 6 pages.
Chinese Office Action issued in Chinese Patent Application No. 201980055065.7 dated Jun. 22, 2022, (w/ English Translation).

* cited by examiner

FIG.6
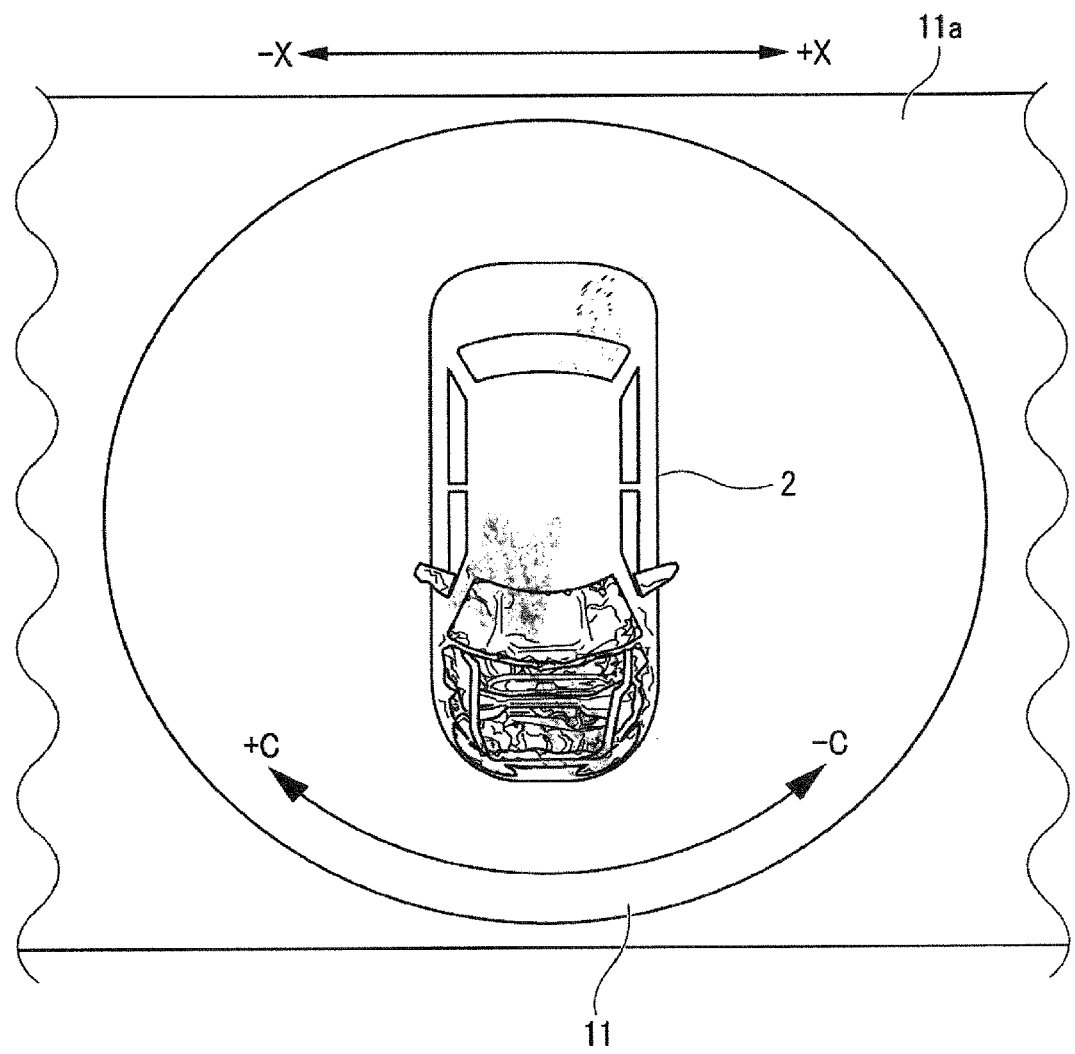
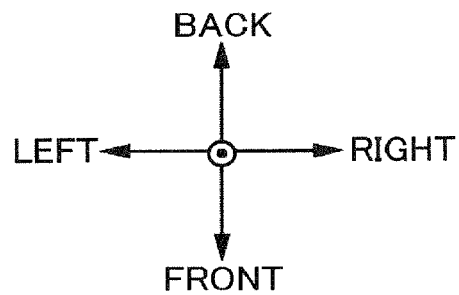

FIG.9
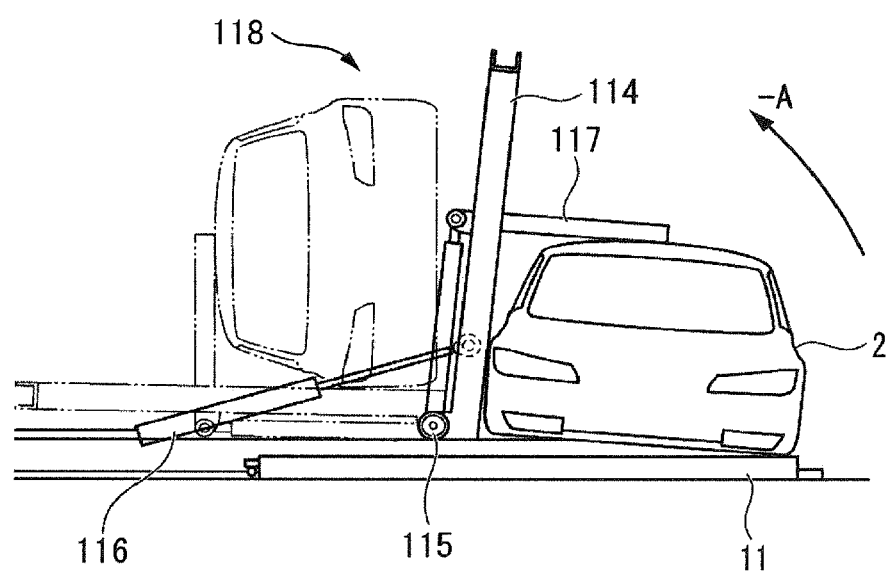
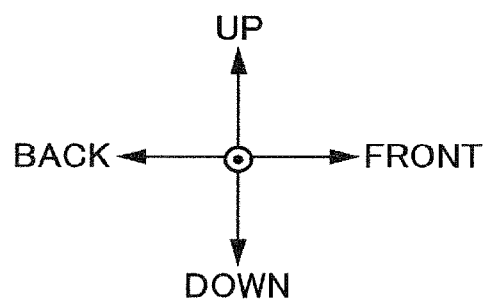

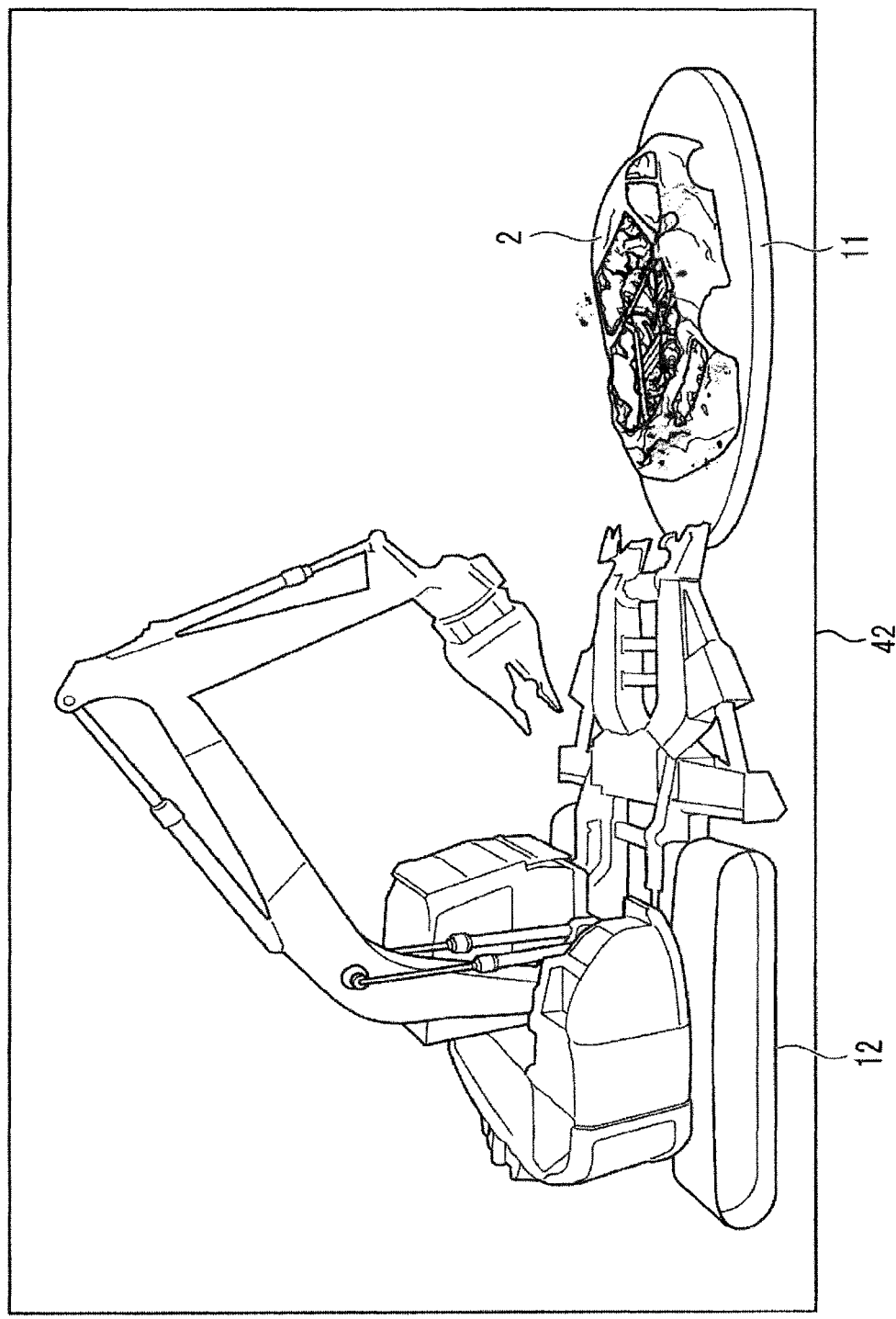

DISMANTLING SYSTEM

TECHNICAL FIELD

The present invention relates to a dismantling system for dismantling an object to be dismantled.

BACKGROUND ART

As shown in Patent Literature 1, a dismantling system for dismantling an object to be dismantled such as a scrap automobile by using a robot has been proposed. The dismantling system includes a product detection means for detecting a type of scrap automobile, a plurality of dismantling robots including a dismantling tool for dismantling a scrap automobile, a robot control means for individually controlling a plurality of dismantling robots, and a system control means for controlling a plurality of dismantling robots as a whole. The system control means stores specific model dismantling information related to a scrap automobile to be dismantled. The robot control means stores general dismantling information related to a scrap automobile to be dismantled. The specific model dismantling information and the general dismantling information are combined in each of the robot control means. The system control means sends the specific model dismantling information corresponding to a scrap automobile to be dismantled based on detection information from the product detection means to the robot control means of a plurality of dismantling robots. Each of the plurality of dismantling robots performs dismantling work on a scrap automobile by combining the specific model dismantling information sent from the system control means and the general dismantling information stored in the corresponding robot control means.

As described above, in a conventional dismantling system, each of the plurality of dismantling robots performs dismantling work on a scrap automobile by combining the specific model dismantling information sent from the system control means and the general dismantling information stored in the corresponding robot control means. For this reason, the operator does not perform the dismantling work by using a dismantling machine.

On the other hand, in a case where the operator performs the dismantling work by using a dismantling machine, there is a problem that it is generally difficult for the operator in a cab to see a working part of a scrap automobile that the operator desires to grasp or break with a tip attachment of the dismantling machine.

Further, in a case where a scrap automobile is moved, a positional relationship between the scrap automobile and the tip attachment of the dismantling machine changes as the distance between them increases, and both of them can no longer be seen by the operator, which causes a problem that the dismantling work becomes difficult.

CITATION LIST

Patent Literature

Patent Literature 1: JP H 11-156775 A

SUMMARY OF INVENTION

The present invention has been made in view of the above problem of the conventional technique, and an object of the present invention is to provide a dismantling system capable of improving visibility of a working part of an object to be dismantled to the operator.

A dismantling system according to an aspect of the present invention is a dismantling system that dismantles an object to be dismantled, and includes a dismantling machine including a dismantling unit for dismantling the object to be dismantled, a viewpoint providing device that provides a field of view from a second viewpoint position for visually recognizing the object to be dismantled, which is different from a first viewpoint position of an operator, and a dismantling operation device that receives operation by the operator of the dismantling unit for dismantling the object to be dismantled with respect to the field of view provided by the viewpoint providing device.

According to the present invention, the position or posture of the dismantling unit with respect to the object to be dismantled can be maintained at an appropriate position or posture that facilitates work for the operator, and the visibility of a working part of the object to be dismantled to the operator can be improved.

BRIEF DESCRIPTION OF DRAWINGS

FIG. 6 is a schematic top view for explaining translational movement of the turntable on which a scrap automobile is placed.

FIG. 9 is a schematic side view for explaining a reversing device that rolls over a scrap automobile on the turntable.

FIG. 21 is a diagram showing an example of a captured image obtained by capturing from a viewpoint position overlooking a scrap automobile on the turntable and the dismantling machine in the present embodiment.

DESCRIPTION OF EMBODIMENTS

Hereinafter, a dismantling system according to an embodiment of the present invention will be described with reference to the drawings. Note that the embodiment described below is an example that embodies the present invention, and does not limit the technical scope of the present invention.

Figure 1:
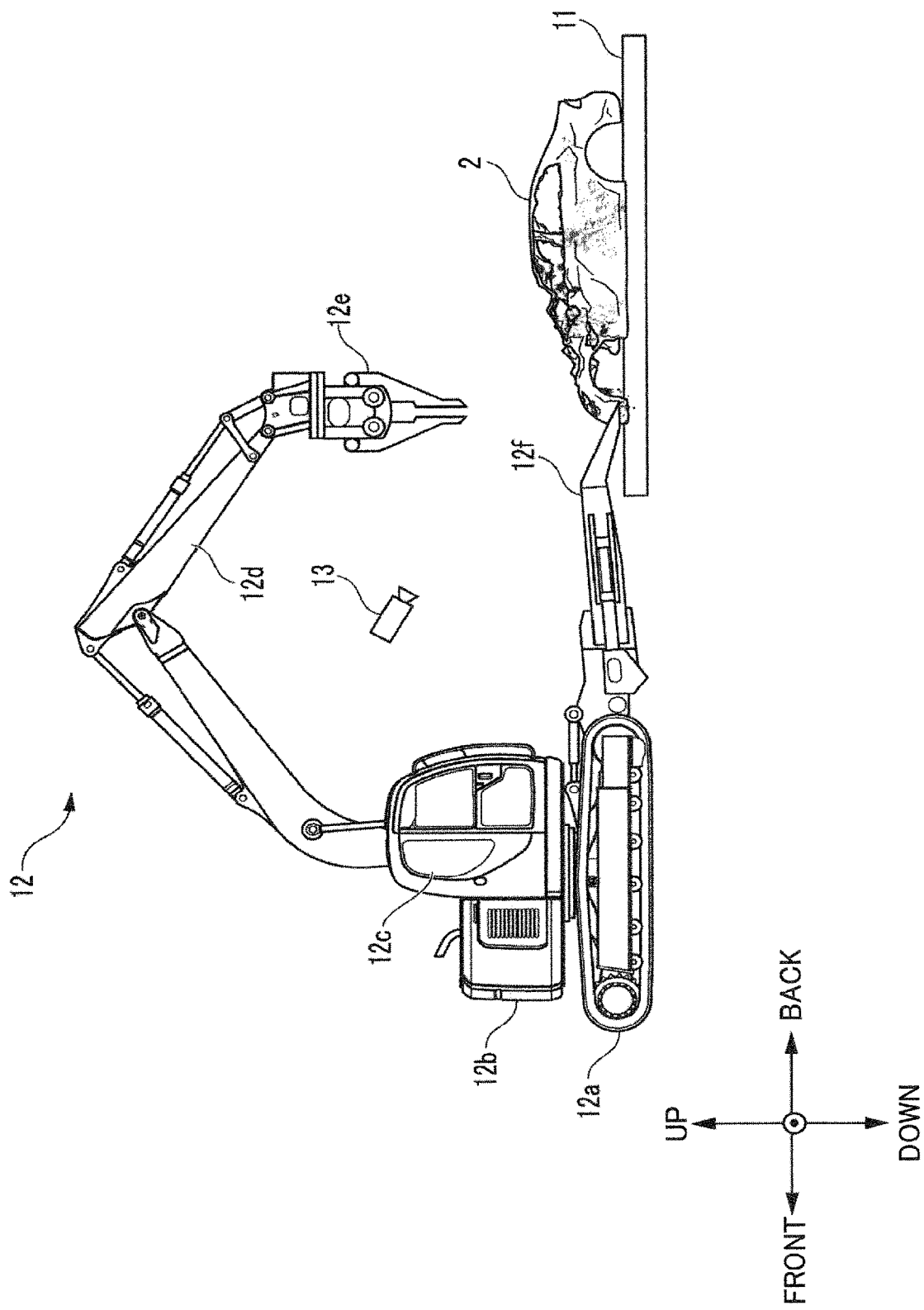
FIG. 1 is a schematic diagram for explaining a dismantling system according to an embodiment of the present invention.

FIG. 1 is a schematic diagram for explaining the dismantling system according to the embodiment of the present invention.

First, a dismantling machine 12 will be described.

A scrap automobile 2 is an example of an object to be dismantled in the dismantling system of the present embodiment. A turntable 11 is an example of a mounting table on which the scrap automobile 2 (object to be dismantled) is placed. The turntable 11 rotates the scrap automobile 2 around a predetermined axis. The turntable 11 rotates the scrap automobile 2 around an axis along an up-down direction (vertical direction). The scrap automobile 2 is placed on the turntable 11. The dismantling machine 12 includes a tip attachment 12e (dismantling unit) for dismantling the scrap automobile 2. Note that, in the description below, the front-back, left-right, and up-down directions are the front-back direction, the left-right direction, and the up-down direction as shown by the bidirectional arrows in FIG. 1.

The dismantling machine 12 includes a traveling base portion 12a including a lower track device and the like, and a slewing body 12b provided on the traveling base portion 12a and rotatable relative to the traveling base portion 12a. That is, in the dismantling machine 12, the traveling base portion 12a slewably supports the slewing body 12b, and is capable of self-propelling by a track device or the like.

The slewing body 12b is provided with an operation chamber 12c for the operator who operates the dismantling machine 12. Further, a working device 12d (working arm) including a boom and an arm that are hydraulically driven and operated is mounted on the slewing body 12b so as to be able to revolve around each support shaft. The dismantling machine 12 is disposed so that the working device 12d (working arm) reaches the scrap automobile 2 on the turntable 11.

Further, the tip attachment 12e (dismantling unit) having a movable tooth pair is attached to the tip of the working device 12d so as to be swingable and slewable. The movable tooth pair of the tip attachment 12e, which follows the operator's operation, three-dimensionally sandwiches part of the scrap automobile 2 from an optional direction. The movable tooth pair of the tip attachment 12e dismantles the scrap automobile 2 by pulling, breaking, or bending part of the sandwiched scrap automobile 2. The operator operates the tip attachment 12e via a dismantling operation device described later. The tip attachment 12e may be operated partially according to a predetermined program executed by a main control device (not shown).

A pressing arm member 12f is provided below the working device 12d and on the front side of the traveling base portion 12a. The pressing arm member 12f includes an arm portion and a pressing portion provided at the tip of the arm portion. The arm portion can revolve around the support shaft on the dismantling machine 12 side. The pressing arm member 12f presses and fixes part of the scrap automobile 2 which is an object to be dismantled with the pressing portion at the tip according to the operation of the operator. This facilitates the work with the tip attachment 12e.

Next, an imaging device 13 will be described.

As shown in FIG. 1, the dismantling system of the present embodiment includes the imaging device 13 disposed between the scrap automobile 2 on the turntable 11 and the dismantling machine 12. The imaging device 13 is a video camera, and functions as part of a viewpoint providing device that provides a field of view from a second viewpoint position for visually recognizing an object to be dismantled, which is different from a first viewpoint position of the operator. The imaging device 13 includes an autofocus system that automatically focuses the camera by using a sensor and a motor controlled by its own control system. The imaging device 13 transmits a captured image to the main control device described later. Further, the imaging device 13 detects a focal position and transmits an imaging signal including a focus position signal indicating the detected focal position to the main control device described later together with the captured image.

The imaging device 13 also functions as a viewpoint detection unit that captures the working part of the scrap automobile 2 and the tip attachment 12e of the dismantling machine 12 and at the same time detects a viewpoint position (focus position) that is the viewpoint for visually recognizing these.

Figure 2:
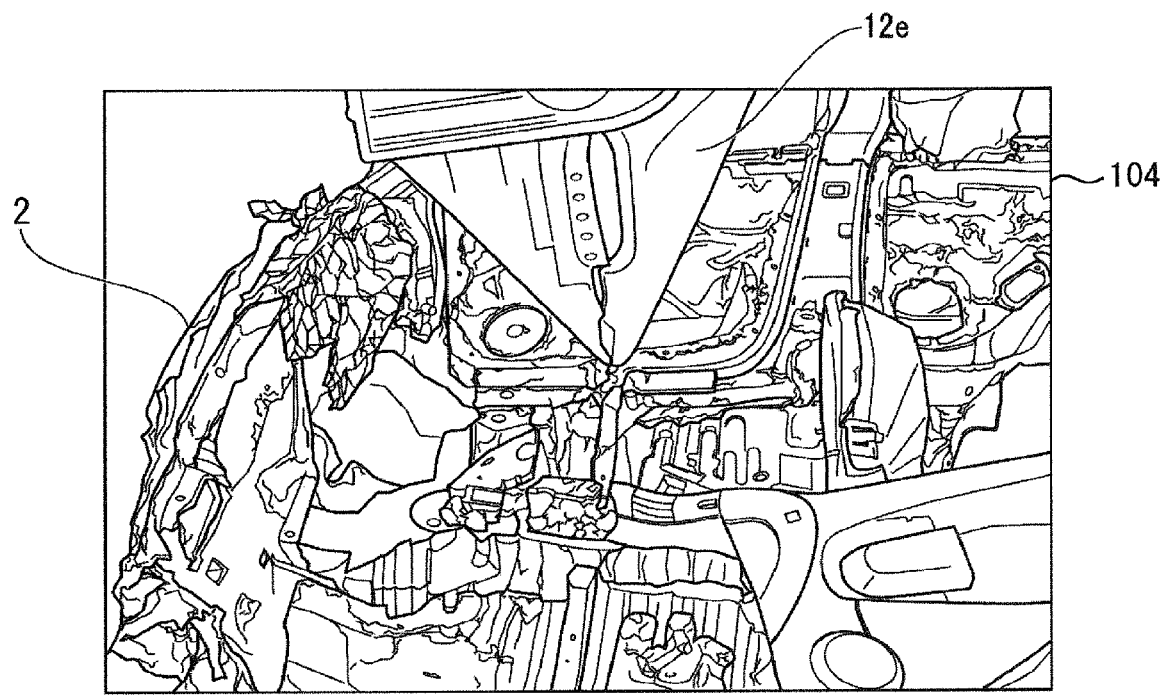
FIG. 2 is a diagram showing an example of an image of a monitor displaying a working part of a scrap automobile and a tip attachment of a dismantling machine in the dismantling system of the present embodiment.

FIG. 2 is a diagram showing an example of an image of a monitor displaying the working part of a scrap automobile and the tip attachment of the dismantling machine in the dismantling system of the present embodiment.

For example, a monitor 104 displays an image obtained by capturing the working part of the scrap automobile 2 and the tip attachment 12e of the dismantling machine 12 as shown in FIG. 2. During the dismantling work, the operator can visually recognize the working part of the scrap automobile 2 and the tip attachment 12e of the dismantling machine 12 as shown in FIG. 2 through the monitor 104. The monitor 104 functions as part of the viewpoint providing device that provides the operator with a field of view from the second viewpoint position for visually recognizing an object to be dismantled, which is different from the first viewpoint position of the operator.

The imaging device 13 further includes a tip attachment recognition system. The tip attachment recognition system is a system that detects the tip attachment 12e of the dismantling machine 12 from the captured image and identifies a unique shape and the like of the detected tip attachment 12e. In the tip attachment recognition system, the unique shape of the tip attachment 12e is identified from a positional relationship of the parts of the tip attachment 12e such as the contour of the tip attachment 12c or the arrangement of screws.

Figure 3:
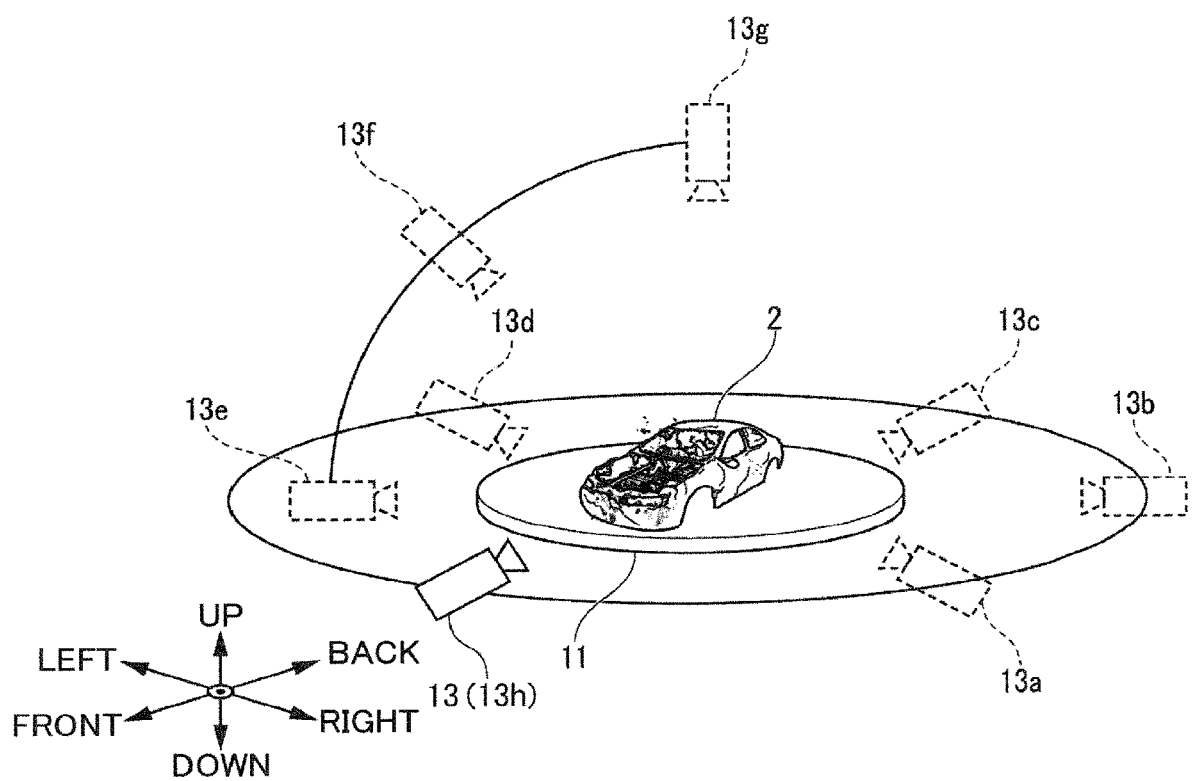
FIG. 3 is a schematic perspective view showing a configuration of a single imaging device capable of capturing an image of a scrap automobile on a turntable from all around in the dismantling system of the present embodiment.

FIG. 3 is a schematic perspective view showing a configuration of a single imaging device capable of capturing an image of the scrap automobile on the turntable from all around in the dismantling system of the present embodiment.

As shown in FIG. 3, the imaging device 13 can move around the scrap automobile 2 as a captured object on the turntable 11 according to operation by the operator through the imaging operation device (not shown) or a predetermined program executed by the main control device (not shown). Further, the imaging device 13 may be an omnidirectional image capturing device capable of panning, tilting, and zooming, and capable of roll rotation.

In FIG. 3, the single imaging device 13 is an omnidirectional image capturing device that can capture an image of the scrap automobile 2 from all around.

The single imaging device 13 of FIG. 3 is fixed to an arm tip of a camera manipulator (not shown). The single imaging device 13 is controlled so as to move in a predetermined track. The predetermined track is, for example, a circumferential track centered on the scrap automobile 2 (turntable 11) to be captured.

The camera manipulator (not shown) is, for example, an articulated and multi-axis control manipulator, which is controlled by the main control device (not shown) together with the imaging device 13. Then, the imaging device 13 can be continuously moved to predetermined spatial positions 13a to 13h on the circumference centered on the scrap automobile 2 by the camera manipulator. The imaging device 13 images the scrap automobile 2 from the predetermined spatial positions 13a to 13h.

Further, the imaging device 13 sequentially transmits the captured image signal and the imaging signal (focus position signal) to the main control device (not shown) for each time of imaging. In this manner, the imaging device 13 can capture an image of the scrap automobile 2 from all around.

Further, the position of the imaging device 13 with respect to the scrap automobile 2 to be captured is not limited. The imaging device 13 may be disposed between the scrap automobile 2 and the dismantling machine 12 on the turntable 11 as shown in FIG. 1. Further, although not shown, the imaging device 13 may be disposed so that the dismantling machine 12 is sandwiched between the imaging device 13 and the scrap automobile 2.

Note that, as another variation, the dismantling system may also include a plurality of imaging devices disposed at a plurality of spatial positions 13a to 13h, and a free viewpoint image of the scrap automobile 2 can be obtained from all around. In this case, the plurality of imaging devices are fixed at a predetermined distance from the scrap automobile 2 (turntable 11) to be captured at the predetermined spatial positions 13a to 13h of an annular or hemispherical support frame (not shown). The plurality of imaging devices may be connected to the main control device (not shown) and controlled by the main control device. In this case, the number of the plurality of imaging devices is not limited.

Next, the turntable 11 will be described.

Figure 4:
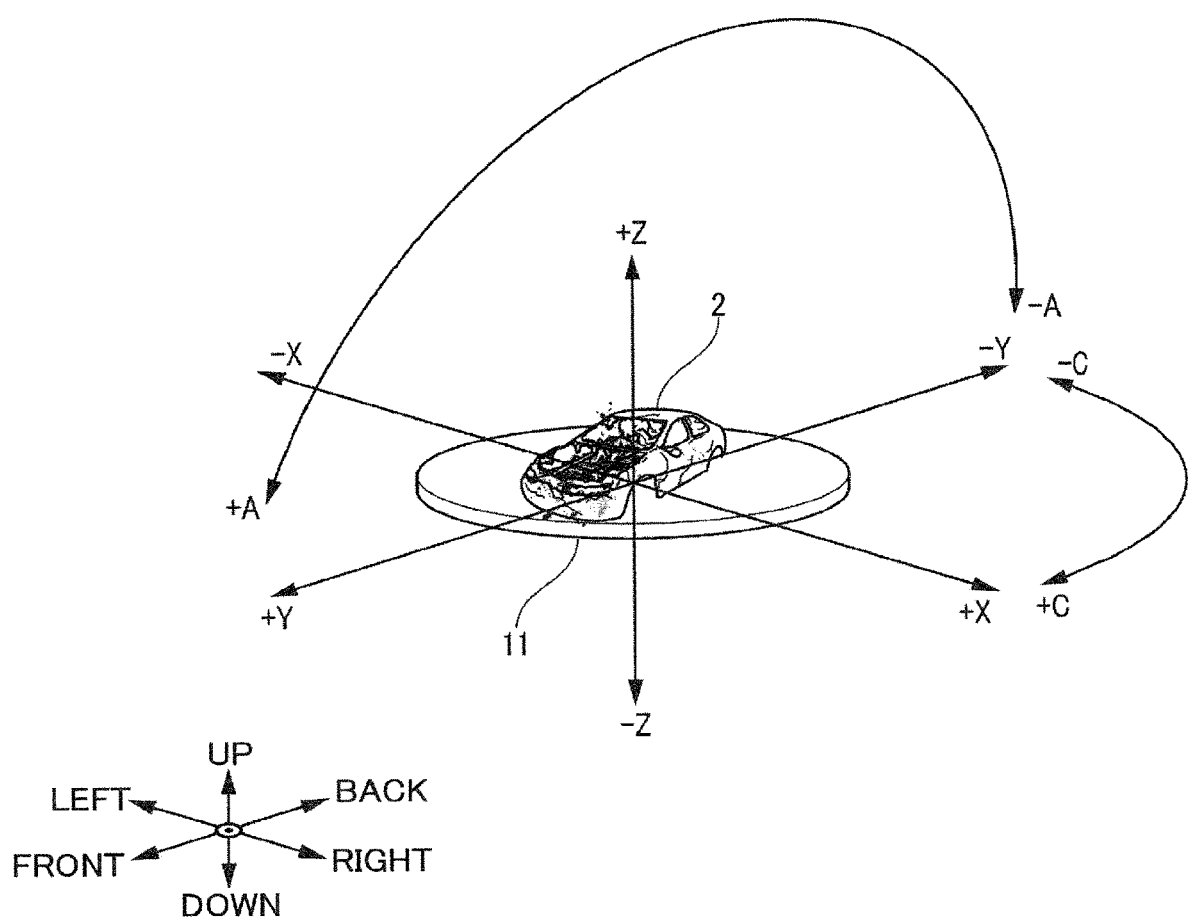
FIG. 4 is a schematic perspective view for explaining movement of the turntable in the present embodiment.

FIG. 4 is a schematic perspective view for explaining movement of the turntable in the present embodiment.

The turntable 11 is part of a dismantling object moving device that moves the scrap automobile 2. As shown in FIG. 4, the turntable 11 on which the scrap automobile 2 is placed is configured to be rotatable around a rotation axis (Z axis) in the vertical direction. The turntable 11 is controlled by the main control device (not shown) that follows the operation of the operator. For example, the turntable 11 shown in FIG. 4 can yaw rotate the scrap automobile 2 being carried in the −C direction and the +C direction. Furthermore, the turntable 11 controlled by the main control device (not shown) can be translated in the X-axis direction. Further, the turntable 11 can be tilted in the −A direction and the +A direction.

Figure 5:
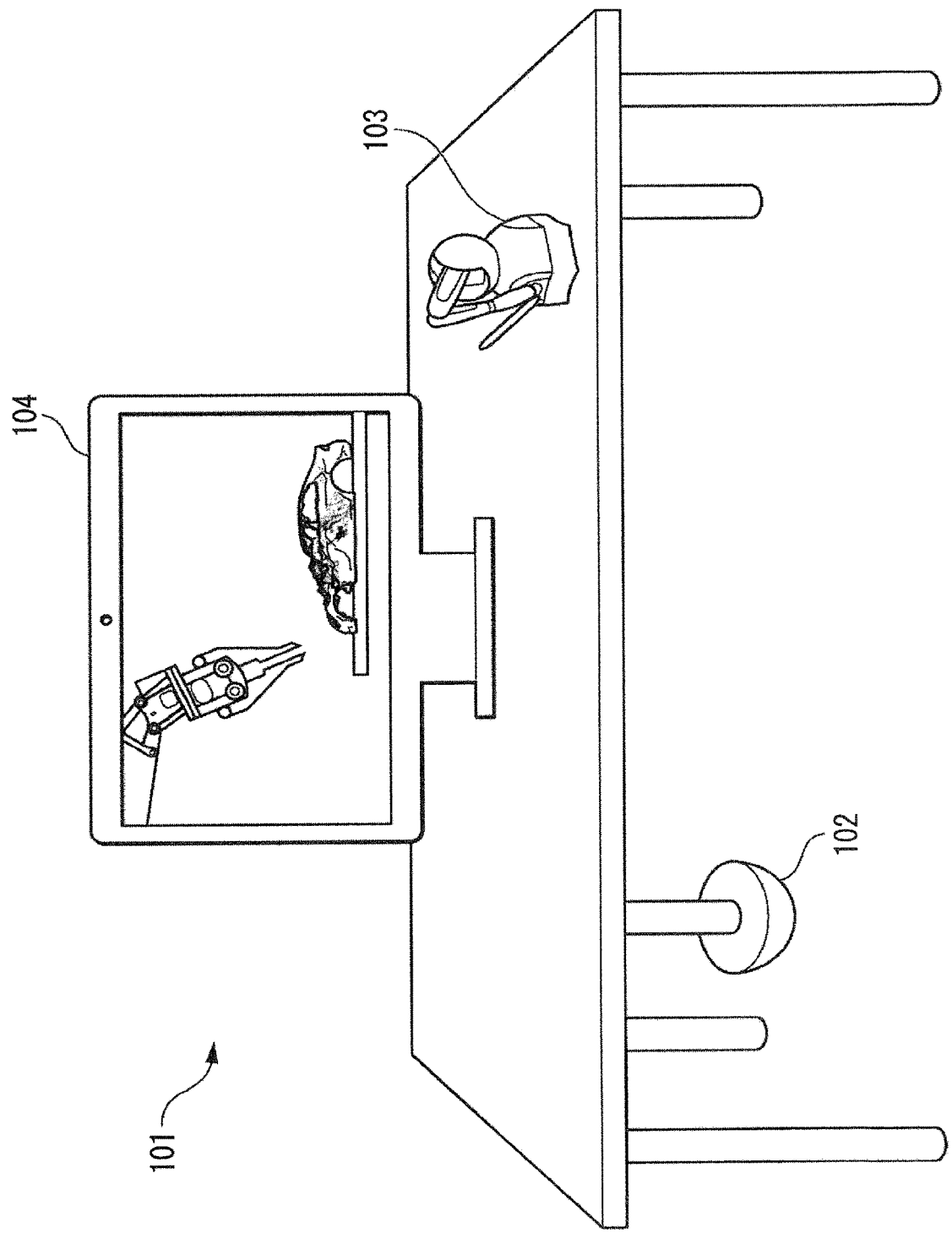
FIG. 5 is a schematic perspective view showing an example of a control console including a dismantling object movement operation device, a dismantling operation device, and a monitor.

FIG. 5 is a schematic perspective view showing an example of a control console including a dismantling object movement operation device, a dismantling operation device, and a monitor.

A dismantling object movement operation device 102, a dismantling operation device 103, and the monitor 104 are connected to the main control device (not shown). The dismantling object movement operation device 102 is disposed so as to project below a control console 101. The dismantling operation device 103 and the monitor 104 are disposed on the control console 101. While looking at the monitor 104, the operator moves the turntable 11 by operating the dismantling object movement operation device 102 with the left hand. The turntable 11 yaw rotates the scrap automobile 2 in the −C and +C directions shown in FIG. 4, translates the scrap automobile 2 in the X-axis direction, and tilts the scrap automobile 2 in the −A and +A directions. While looking at the monitor 104, the operator moves the tip attachment 12e by operating the dismantling operation device 103 with the right hand to dismantle the scrap automobile 2.

FIG. 6 is a schematic top view for explaining translational movement of the turntable on which the scrap automobile is placed.

As shown in FIG. 6, the turntable 11 on which the scrap automobile 2 is placed is carried on a carriage (not shown) disposed below the turntable 11. As the carriage moves on a rail 11a, the turntable 11 can slide left and right. Note that the translational movement is not limited to be performed on the rail 11a, but can also be driven by a belt. The operator can translate the scrap automobile 2 by operating the carriage with the dismantling object movement operation device 102 (not shown) while looking at the monitor 104 (not shown). In this configuration, the turntable 11 can be translated while being rotated.

Figure 7:
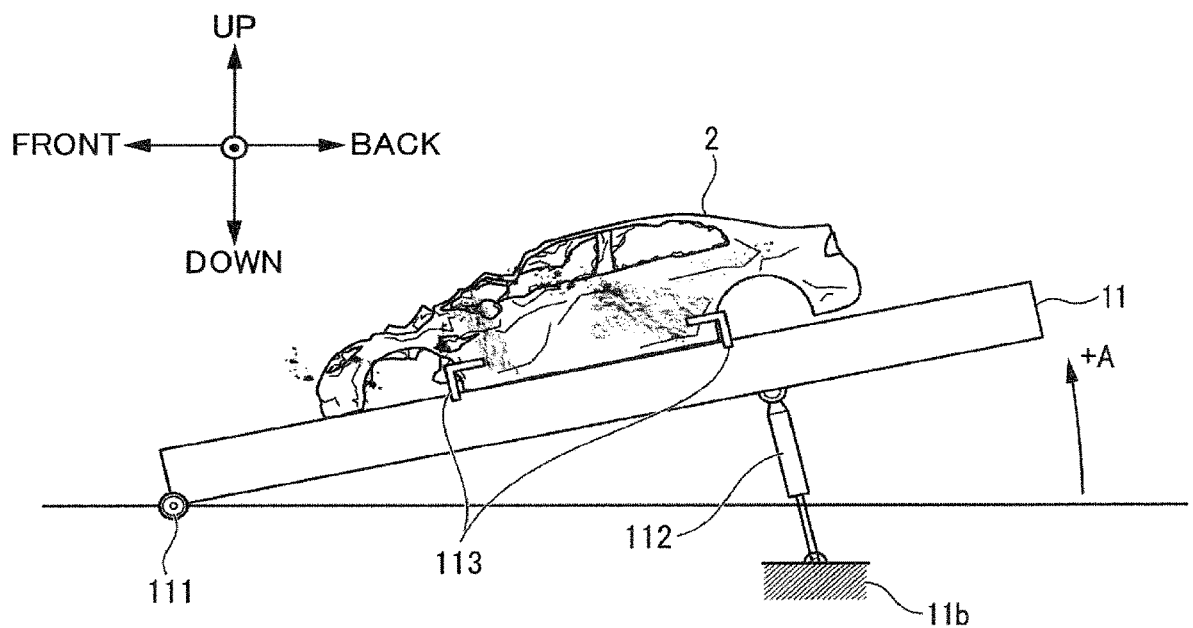
FIG. 7 is a schematic side view for explaining tilting of the turntable on which a scrap automobile is placed.

FIG. 7 is a schematic side view for explaining tilting of the turntable on which a scrap automobile is placed.

As shown in FIG. 7, a yaw-rotatable rotating plate 11b is formed in the lower part of the turntable 11 on which the scrap automobile 2 is placed. A pivot shaft 111 that pivotally supports the turntable 11 is provided on the upper front side of the rotating plate 11b, a jack 112 is provided on the lower upper back side of the rotating plate 11b, and, as the jack 112 lifts the turntable 11, the turntable 11 can be tilted in the +A direction. In this manner, the turntable 11 can be tilted. For example, if the scrap automobile 2 is tilted in the direction of lowering a hood of the scrap automobile 2, an advantage that the dismantling work can be easily performed can be obtained.

Furthermore, the turntable 11 is provided with a fixing portion 113 such as a hook for fixing the fender of the scrap automobile 2 in order to prevent slipping when the scrap automobile 2 is tilted. The fixing portion 113 fixes the scrap automobile 2 (object to be dismantled) to the turntable 11. Note that, in a case where the scrap automobile 2 is in a state where tires are mounted, a tire lock or the like may be provided on the turntable 11 as the fixing portion 113, for example. The operator can tilt the scrap automobile 2 by operating the jack 112 with the dismantling object movement operation device 102 (not shown) while looking at the monitor 104 (not shown).

Figure 8:
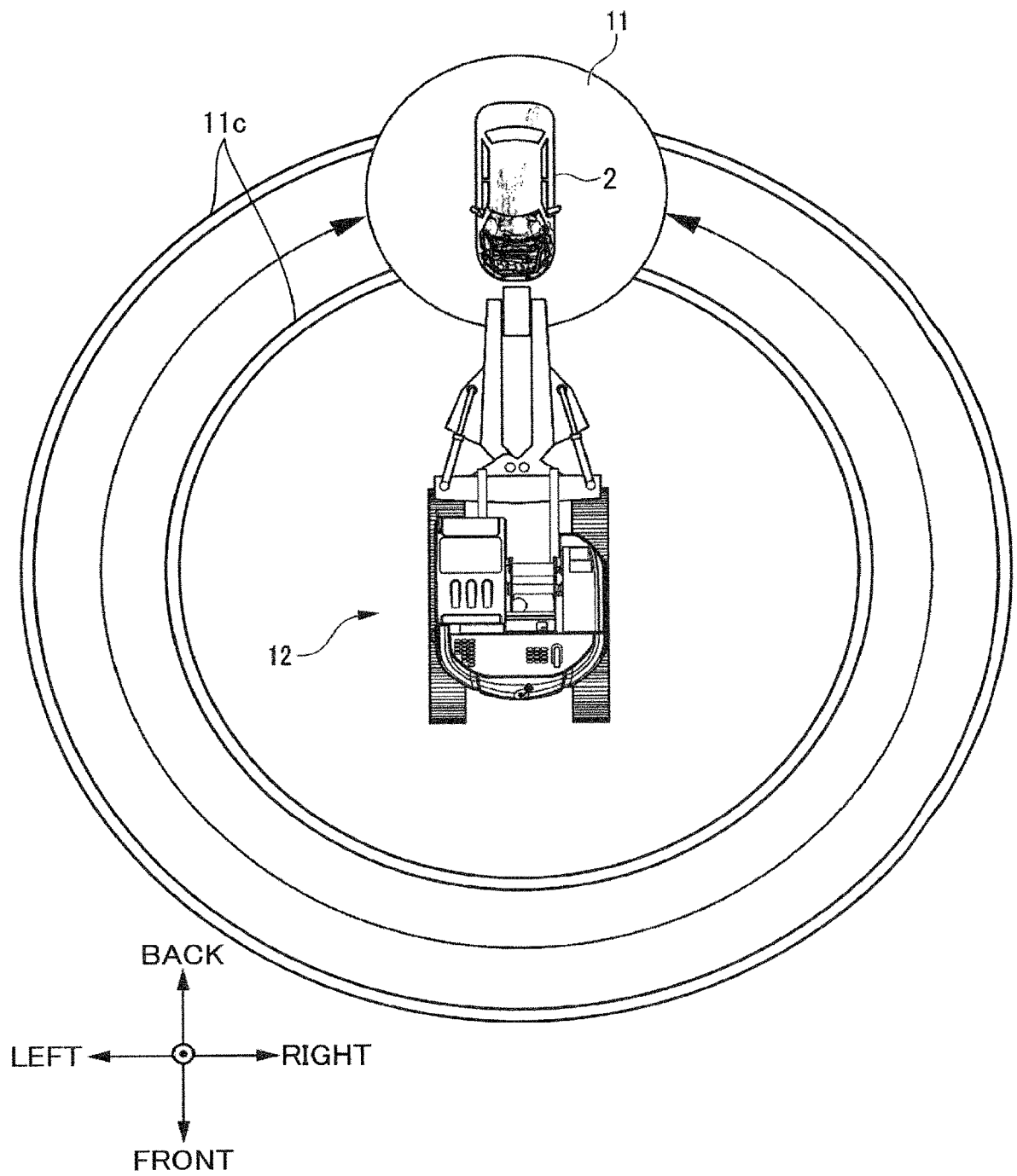
FIG. 8 is a schematic top view for explaining revolving of the turntable on which a scrap automobile is placed.

FIG. 8 is a schematic top view for explaining revolving of the turntable on which a scrap automobile is placed.

The turntable 11 on which the scrap automobile 2 is placed moves on the circumference centered on the dismantling machine 12. As shown in FIG. 8, the turntable 11 on which the scrap automobile 2 is placed is carried on the carriage (not shown) disposed below the turntable 11. The carriage revolves on a circular rail 11c. Note that the revolving movement is not limited to be performed on the rail 11c, but can also be driven by a belt. The operator can cause the scrap automobile 2 to revolve by operating the carriage with the dismantling object movement operation device 102 (not shown) while looking at the monitor 104 (not shown). In this configuration, the turntable 11 can be moved in a revolving manner while being rotated.

FIG. 9 is a schematic side view for explaining a reversing device that rolls over a scrap automobile on the turntable.

As shown in FIG. 9, a reversing device 118 is provided on the turntable 11 on which the scrap automobile 2 is placed. The reversing device 118 includes a frame 114 having an L-shaped cross section, a pivot shaft 115 that pivotally supports a corner side portion of the frame 114, and a jack 116 provided near the pivot shaft 115 of a standing portion of the frame 114. The reversing device 118 is configured to roll over the scrap automobile 2 on the turntable 11 in the −A direction. In this manner, the tip attachment 12e can make access to the lower surface side of the scrap automobile 2, and an advantage that the dismantling work is facilitated can be obtained. Furthermore, the reversing device 118 includes a fixing device 117 such as a hook for fixing the ceiling of the scrap automobile 2 when the scrap automobile 2 rolls over. In this manner, the posture of the scrap automobile 2 can be stabilized. The operator can tilt the scrap automobile 2 by operating the fixing device 117 and the jack 116 with the dismantling object movement operation device 102 (not shown) while looking at the monitor 104 (not shown).

Next, the entire configuration of the dismantling system will be described.

Figure 10:
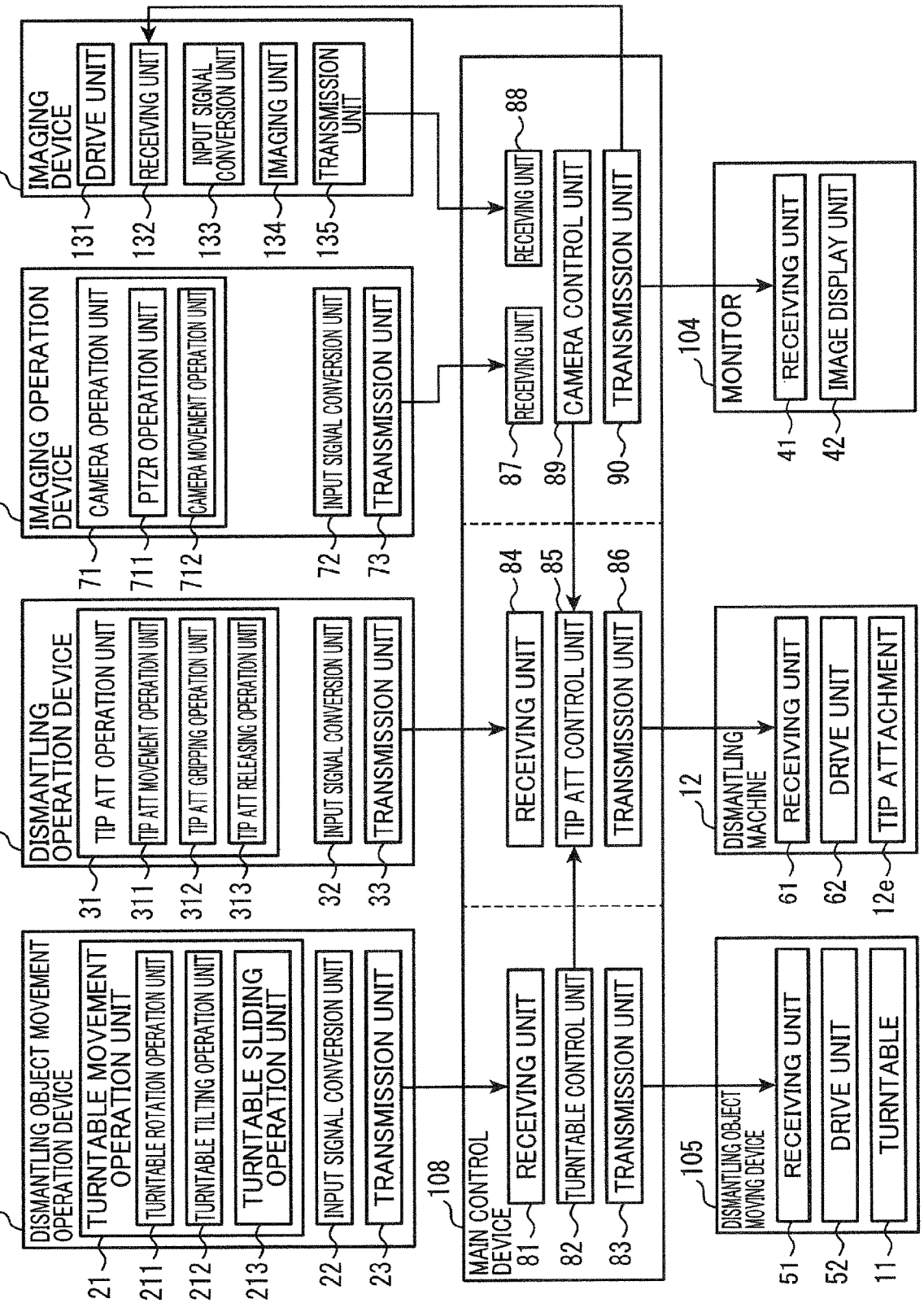
FIG. 10 is a block diagram showing an entire configuration of the dismantling system in the present embodiment.

FIG. 10 is a block diagram showing the entire configuration of the dismantling system in the present embodiment.

The dismantling system shown in FIG. 10 includes a dismantling object moving device 105, the dismantling machine 12, the imaging device 13, the monitor 104, a main control device 108, the dismantling object movement operation device 102, and the dismantling operation device 103, and an imaging operation device 107. The dismantling object movement operation device 102, the dismantling operation device 103, and the imaging operation device 107 are used by the operator to remotely control the dismantling object moving device 105 (turntable 11), the dismantling machine 12 (tip attachment 12e), and the imaging devices 13 through the main control device 108.

The dismantling object movement operation device 102 receives operation by the operator of the dismantling object moving device 105. The dismantling object movement operation device 102 includes a turntable movement operation unit 21, an input signal conversion unit 22, and a transmission unit 23.

The turntable movement operation unit 21 receives movement operation of the turntable 11 by an operator. The turntable movement operation unit 21 includes a turntable rotation operation unit 211, a turntable tilting operation unit 212, and a turntable sliding operation unit 213.

The turntable rotation operation unit 211 is an example of a rotation operation receiving unit, and receives operation by the operator for rotating the turntable 11 of the dismantling object moving device 105 around a predetermined axis. The turntable rotation operation unit 211 generates a turntable operation signal for rotating the turntable 11 around a predetermined axis.

The turntable tilting operation unit 212 receives operation by the operator for tilting the turntable 11 of the dismantling object moving device 105 at a predetermined angle. The turntable tilting operation unit 212 generates a turntable operation signal for tilting the turntable 11 at a predetermined angle.

The turntable sliding operation unit 213 receives operation by the operator for translating the turntable 11 of the dismantling object moving device 105 in a predetermined direction. The turntable tilting operation unit 212 generates a turntable operation signal for translating the turntable 11 in a predetermined direction.

The turntable rotation operation unit 211, the turntable tilting operation unit 212, and the turntable sliding operation unit 213 are operated by the operator's hands and fingers, and generate a turntable operation signal corresponding to the operation.

Note that the turntable movement operation unit 21 may further include a turntable revolving operation unit that receives operation by the operator for moving the turntable 11 along a circle centered on the dismantling machine 12. In this case, the turntable revolving operation unit generates a turntable operation signal for moving the turntable 11 along a circle centered on the dismantling machine 12.

The input signal conversion unit 22 of the dismantling object movement operation device 102 converts an input signal from the turntable rotation operation unit 211, the turntable tilting operation unit 212, and the turntable sliding operation unit 213 into a transmission signal.

The transmission unit 23 of the dismantling object movement operation device 102 transmits a turntable operation signal converted by the input signal conversion unit 22 to the main control device 108.

The dismantling operation device 103 receives operation by the operator of the tip attachment 12e (dismantling unit) for disassembling the object to be dismantled with respect to the field of view from the second viewpoint position provided by the imaging device 13 and the monitor 104 (viewpoint providing device). The dismantling operation device 103 includes a tip ATT operation unit (tip attachment operation unit) 31, an input signal conversion unit 32, and a transmission unit 33.

The tip ATT operation unit 31 receives operation of the tip attachment 12e by the operator. The tip ATT operation unit 31 includes a tip ATT movement operation unit (tip attachment movement operation unit) 311, a tip ATT gripping operation unit (tip attachment gripping operation unit) 312, and a tip ATT releasing operation unit (tip attachment releasing operation unit) 313.

The tip ATT movement operation unit 311 receives movement operation by the operator for the tip attachment 12e of the dismantling machine 12. The tip ATT movement operation unit 311 generates a tip attachment operation signal for moving the tip attachment 12e to a predetermined position.

The tip ATT gripping operation unit 312 receives gripping operation by the operator for the tip attachment 12e of the dismantling machine 12. The tip ATT movement operation unit 311 generates a tip attachment operation signal for gripping a dismantling part of the scrap automobile 2 with the tip attachment 12e.

The tip ATT releasing operation unit 313 receives releasing operation by the operator for the tip attachment 12e of the dismantling machine 12. The tip ATT movement operation unit 311 generates a tip attachment operation signal for releasing a dismantling part of the scrap automobile 2 by the tip attachment 12e.

The tip ATT movement operation unit 311, the tip ATT gripping operation unit 312, and the tip ATT releasing operation unit 313 are operated by the operator's hands and fingers, and generate a tip attachment operation signal corresponding to each operation.

The input signal conversion unit 32 of the dismantling operation device 103 converts an input signal from the tip ATT movement operation unit 311, the tip ATT gripping operation unit 312, and the tip ATT releasing operation unit 313 into a transmission signal.

The transmission unit 33 of the dismantling operation device 103 transmits the tip attachment operation signal converted by the input signal conversion unit 32 to the main control device 108.

The imaging operation device 107 includes a camera operation unit 71, an input signal conversion unit 72, and a transmission unit 73.

The camera operation unit 71 receives operation of the imaging device 13 by the operator. The camera operation unit 71 includes a PTZR operation unit (panning/tilting/zooming/rolling operation unit) 711 and a camera movement operation unit 712.

The PTZR operation unit 711 receives panning operation, tilting operation, zooming operation, or rolling operation by the operator of the imaging device 13. The PTZR operation unit 711 generates a camera operation signal for causing the imaging device 13 to perform panning, tilting, zooming, or rolling.

The camera movement operation unit 712 receives movement operation by the operator of the imaging device 13. The camera movement operation unit 712 generates a camera operation signal for moving the imaging device 13 to a predetermined position.

The PTZR operation unit 711 and the camera movement operation unit 712 are operated by the operator's hand and finger, and generate a camera operation signal corresponding to each operation.

The input signal conversion unit 72 of the imaging operation device 107 converts an input signal from the PTZR operation unit 711 and the camera movement operation unit 712 into a transmission signal.

The transmission unit 73 of the imaging operation device 107 transmits the camera operation signal converted by the input signal conversion unit 72 to the main control device 108.

The imaging device 13 takes an image of the scrap automobile 2 (object to be dismantled). The imaging device 13 includes a drive unit 131, a receiving unit 132, an input signal conversion unit 133, an imaging unit 134, and a transmission unit 135.

The imaging unit 134 takes an image of the scrap automobile 2. The imaging unit 134 outputs a captured image and an imaging signal. The imaging signal includes a focus position signal.

The input signal conversion unit 133 converts an input signal from the imaging unit 134 into a transmission signal.

The transmission unit 135 transmits the captured image and the imaging signal converted by the input signal conversion unit 133 to the main control device 108.

The receiving unit 132 receives a camera control signal transmitted by the main control device 108.

The drive unit 131 moves the entire imaging device 13 based on the camera control signal received from the main control device 108. Further, the drive unit 131 performs panning, tilting, zooming, and rolling based on the camera control signal received from the main control device 108.

The main control device 108 includes an arithmetic processing unit such as a central processing unit (CPU), a memory such as a read only memory (ROM) and a random access memory (RAM), a storage device such as a hard disk drive (HDD), an input/output (I/O) device, and the like. The main control device 108 functions as a turntable control unit 82, a tip ATT control unit 85, and a camera control unit 89 by reading and executing a predetermined program. The main control device 108 is an example of a movement control device.

The main control device 108 includes a receiving unit 81, the turntable control unit 82, a transmission unit 83, a receiving unit 84, the tip ATT control unit (tip attachment control unit) 85, a transmission unit 86, a receiving unit 87, a receiving unit 88, the camera control unit 89, and a transmission unit 90.

The receiving unit 81 receives a transmission signal (turntable operation signal) transmitted by the dismantling object movement operation device 102. The receiving unit 84 receives a transmission signal (tip attachment operation signal) transmitted by the dismantling operation device 103. The receiving unit 87 receives a transmission signal (camera operation signal) transmitted by the imaging operation device 107. The receiving unit 88 receives a transmission signal (captured image and imaging signal) transmitted by the imaging device 13.

The turntable control unit 82 processes a transmission signal received by the receiving unit 81. The tip ATT control unit 85 processes a transmission signal received by the receiving unit 84. The camera control unit 89 processes a transmission signal received by the receiving units 87 and 88.

The turntable control unit 82 generates a turntable control signal for controlling rotation, tilting, sliding, and raising/lowering of the turntable 11 based on a turntable operation signal from the dismantling object movement operation device 102.

Further, the turntable control unit 82 generates a turntable position signal indicating the position of the turntable 11, and supplies the generated turntable position signal to the tip ATT control unit 85.

The transmission unit 83 transmits the turntable control signal generated by the turntable control unit 82 to the dismantling object moving device 105.

The tip ATT control unit 85 generates a tip attachment control signal for moving the tip attachment 12e based on the tip attachment operation signal from the dismantling operation device 103.

The transmission unit 86 transmits the tip attachment control signal generated by the tip AT control unit 85 to the dismantling machine 12.

The camera control unit 89 generates a camera control signal for controlling the movement, panning operation, tilting operation, zooming operation, or rolling operation of the imaging device 13 based on the camera operation signal from the imaging operation device 107. Further, the camera control unit 89 generates a camera control signal for moving the imaging device 13 to a viewpoint position for visually recognizing the scrap automobile 2 and the tip attachment 12e based on the imaging signal from the imaging device 13.

That is, in a case where the tip of the tip attachment 12e (dismantling unit) deviates from the center of the field of view, the camera control unit 89 moves the imaging device 13 so that the tip of the tip attachment 12e (dismantling unit) is displayed in the center of the field of view.

Further, the camera control unit 89 generates a camera position signal indicating the position of the imaging device 13, and supplies the generated camera position signal to the tip ATT control unit 85.

The transmission unit 90 transmits the camera control signal generated by the camera control unit 89 to the imaging device 13. Further, the transmission unit 90 transmits the captured image received from the imaging device 13 to the monitor 104.

The dismantling object moving device 105 moves the scrap automobile 2 (object to be dismantled). The dismantling object moving device 105 moves the scrap automobile 2 by moving the turntable 11 on which the scrap automobile 2 is placed. The dismantling object moving device 105 includes the turntable 11, a receiving unit 51, and a drive unit 52.

The receiving unit 51 receives the turntable control signal transmitted by the main control device 108.

The drive unit 52 moves the turntable 11 based on the turntable control signal received by the receiving unit 51. The drive unit 52 is an example of a rotation unit, and rotates the turntable 11 around a predetermined axis. Further, the drive unit 52 is an example of a translational movement unit, and translates the turntable 11. Further, the drive unit 52 is an example of a tilting unit, and tilts the turntable 11. Further, the drive unit 52 is an example of a revolving unit, and moves the turntable 11 along a circle centered on the dismantling machine 12.

The dismantling machine 12 includes the tip attachment 12e, a receiving unit 61, and a drive unit 62.

The receiving unit 61 receives the tip attachment control signal transmitted by the main control device 108.

The drive unit 62 moves the tip attachment 12e based on the tip attachment control signal received by the receiving unit 61. Further, the drive unit 62 performs gripping operation of the tip attachment 12e based on the tip attachment control signal received by the receiving unit 61. Further, the drive unit 62 performs releasing operation of the tip attachment 12e based on the tip attachment control signal received by the receiving unit 61.

The monitor 104 displays an image captured by the imaging device 13. The monitor 104 includes a receiving unit 41 and an image display unit 42.

The receiving unit 41 receives the captured image transmitted by the main control device 108. The image display unit 42 displays the captured image received by the receiving unit 41. The image display unit 42 displays an image of the working part of the scrap automobile 2 and the tip attachment 12e of the dismantling machine 12.

In the above description, an example in which the dismantling object movement operation device 102 and the imaging operation device 107 are independent is described. However, the dismantling object movement operation device 102 and the imaging operation device 107 may be integrated. For example, the dismantling object movement operation device 102 shown in FIG. 5 may move both or either one of the turntable 11 and the imaging device 13.

Specifically, for example, in a case where a grip portion of the dismantling object movement operation device 102 is rotated in one direction around the vertical axis, the dismantling object moving device 105 may rotate the turntable 11 in the same forward direction as the rotation direction of the grip portion. Further, in a case where the grip portion of the dismantling object movement operation device 102 is rotated in one direction around the vertical axis, the imaging device 13 may revolve around the turntable 11 or the scrap automobile 2 in the reverse direction opposite to the rotation direction of the grip portion.

Further, in a case where the grip portion of the dismantling object movement operation device 102 is slid in one direction in the horizontal direction, the dismantling object moving device 105 may translate the turntable 11 in the same forward direction as the sliding movement direction of the grip portion. Further, in a case where the grip portion of the dismantling object movement operation device 102 is slid in one direction in the horizontal direction, the imaging device 13 may be translated in the reverse direction opposite to the sliding movement direction of the grip portion.

Further, in a case where the grip portion of the dismantling object movement operation device 102 is tilted in one direction around the axis in the horizontal direction, the dismantling object moving device 105 may tilt the turntable 11 in the same forward direction as the tilting direction of the grip portion. Further, in a case where the grip portion of the dismantling object movement operation device 102 is tilted in one direction around the axis in the horizontal direction, the imaging device 13 may be tilted in the reverse direction opposite to the tilting direction of the grip portion.

By the above operation, the operator can use the dismantling object movement operation device 102 to obtain a field of view of looking around the scrap automobile 2 as if the operator picks up the scrap automobile 2 and turns it around.

Next, an example of the operation of the turntable 11 will be described.

Figure 11:
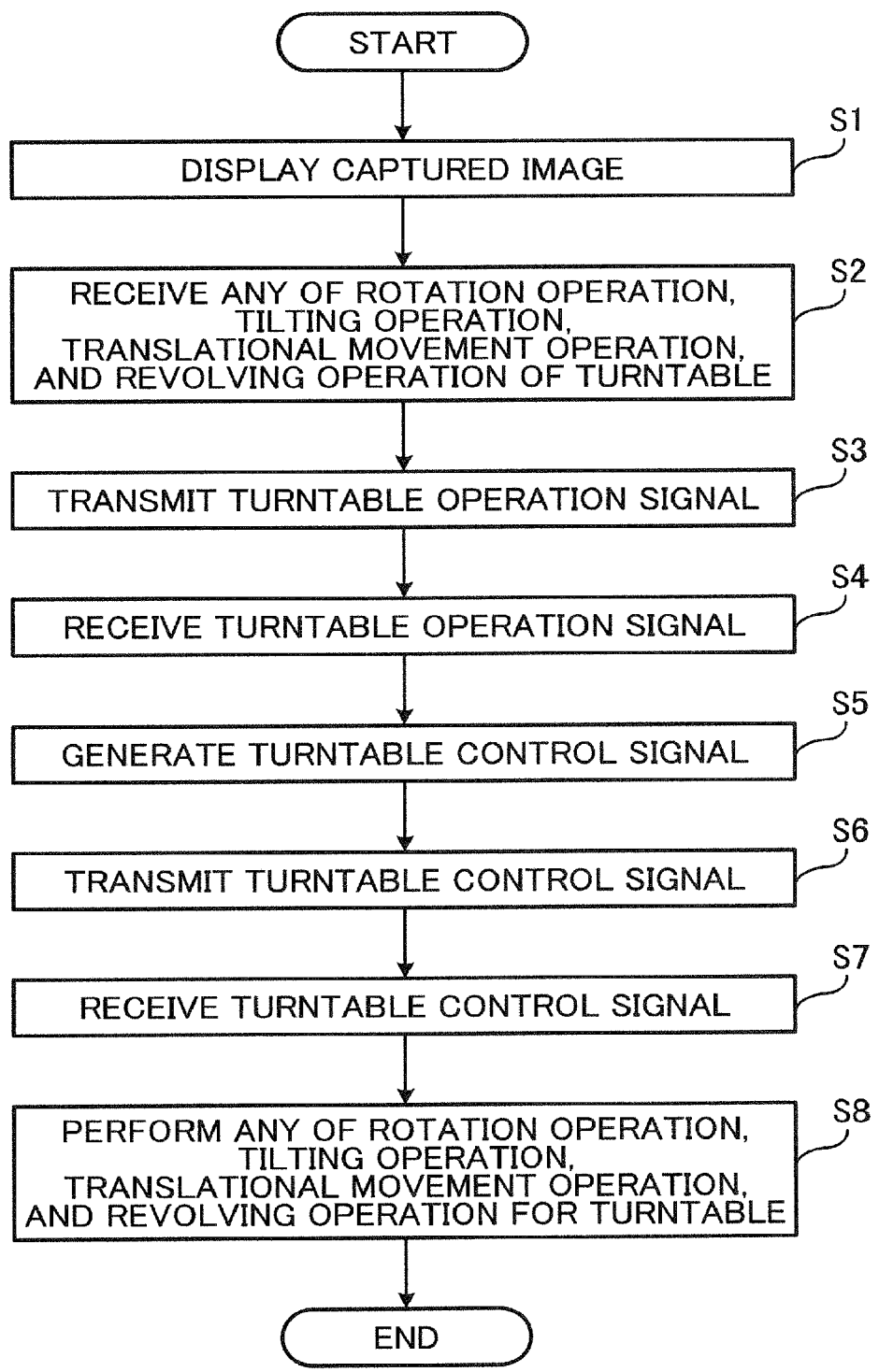
FIG. 11 is a flowchart for explaining an example of operation of the turntable in the dismantling system of the present embodiment.

FIG. 11 is a flowchart for explaining an example of operation of the turntable in the dismantling system of the present embodiment.

First, in Step S1, the image display unit 42 of the monitor 104 displays the captured image obtained from the viewpoint position for visually recognizing the scrap automobile 2 and the tip attachment 12e.

Next, in Step S2, the turntable movement operation unit 21 of the dismantling object movement operation device 102 receives any of the rotation operation, the tilting operation, the translational movement operation, and the revolving operation of the turntable 11 by the operator. The operator operates the turntable 11 and the jack 112 by using the dismantling object movement operation device 102 while looking at the monitor 104. Note that the jack 112 may be located above or below the turntable 11.

Next, in Step S3, the transmission unit 23 of the dismantling object movement operation device 102 transmits, to the main control device 108, the turntable operation signal indicating any of the rotation operation, the tilting operation, the translational movement operation, and the revolving operation of the turntable 11 input by the turntable movement operation unit 21.

Next, in Step S4, the receiving unit 81 of the main control device 108 receives the turntable operation signal transmitted by the dismantling object movement operation device 102.

Next, in Step S5, the turntable control unit 82 of the main control device 108 generates the turntable control signal indicating the rotation operation, the tilting operation, the translational movement operation, and the revolving operation of the turntable 11 based on the turntable operation signal received by the receiving unit 81.

Next, in Step S6, the transmission unit 83 of the main control device 108 transmits the turntable control signal generated by the turntable control unit 82 to the dismantling object moving device 105.

Next, in Step S7, the receiving unit 51 of the dismantling object moving device 105 receives the turntable control signal transmitted by the main control device 108.

Next, in Step S8, the drive unit 52 of the dismantling object moving device 105 performs any of the rotation operation, the tilting operation, the translational movement operation, and the revolving operation for the turntable 11 based on the turntable control signal received by the receiving unit 51.

By repeating the processing of Steps S1 to S8, the turntable 11 is moved to the position desired by the operator.

Next, an example of operation of the tip attachment 12e will be described.

Figure 12:
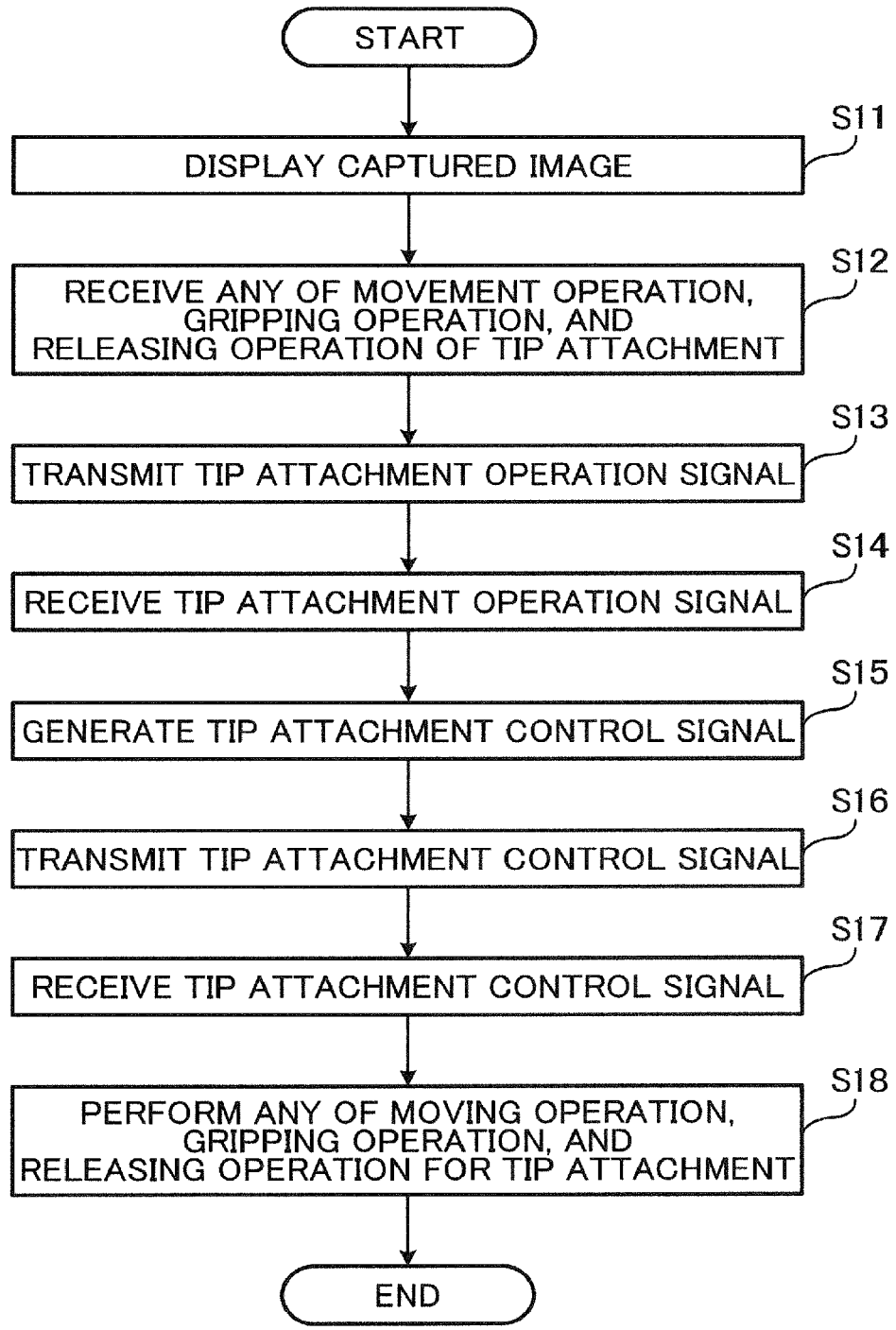
FIG. 12 is a flowchart for explaining an example of operation of the tip attachment in the dismantling system of the present embodiment.

FIG. 12 is a flowchart for explaining an example of operation of the tip attachment in the dismantling system of the present embodiment.

First, in Step S11, the image display unit 42 of the monitor 104 displays the captured image obtained from the viewpoint position for visually recognizing the scrap automobile 2 and the tip attachment 12e.

Next, in Step S12, the tip ATT operation unit 31 of the dismantling operation device 103 receives any of the movement operation, the gripping operation, and the releasing operation of the tip attachment 12e by the operator. The operator operates the tip attachment 12e using the dismantling operation device 103 while looking at the monitor 104.

Next, in Step S13, the transmission unit 33 of the dismantling operation device 103 transmits, to the main control device 108, the tip attachment operation signal indicating any of the movement operation, the gripping operation, and the releasing operation of the tip attachment 12e input by the tip ATT operation unit 31.

Next, in Step S14, the receiving unit 84 of the main control device 108 receives the tip attachment operation signal transmitted by the dismantling operation device 103.

Next, in Step S15, the tip ATT control unit 85 of the main control device 108 generates the tip attachment control signal indicating any of the movement operation, the gripping operation, and the releasing operation of the tip attachment 12e based on the tip attachment operation signal received by the receiving unit 84.

Next, in Step S16, the transmission unit 86 of the main control device 108 transmits the tip attachment control signal generated by the tip ATT control unit 85 to the dismantling object moving device 105.

Next, in Step S17, the receiving unit 61 of the dismantling machine 12 receives the tip attachment control signal transmitted by the main control device 108.

Next, in Step S18, the drive unit 62 of the dismantling machine 12 performs any of the movement operation, the gripping operation, and the releasing operation for the tip attachment 12e based on the tip attachment control signal received by the receiving unit 61. The operator uses the dismantling operation device 103 to perform the dismantling work for the scrap automobile 2. Note that the operator may operate the tip attachment 12e with the right hand and the imaging device 13 and the turntable 11 with the left hand.

By repeating the processing of Steps S11 to S18, the scrap automobile 2 is dismantled by the tip attachment 12e.

Next, the processing in which the main control device 108 always displays the tip of the tip attachment 12e in the field of view of the imaging device 13 will be described.

Figure 13:
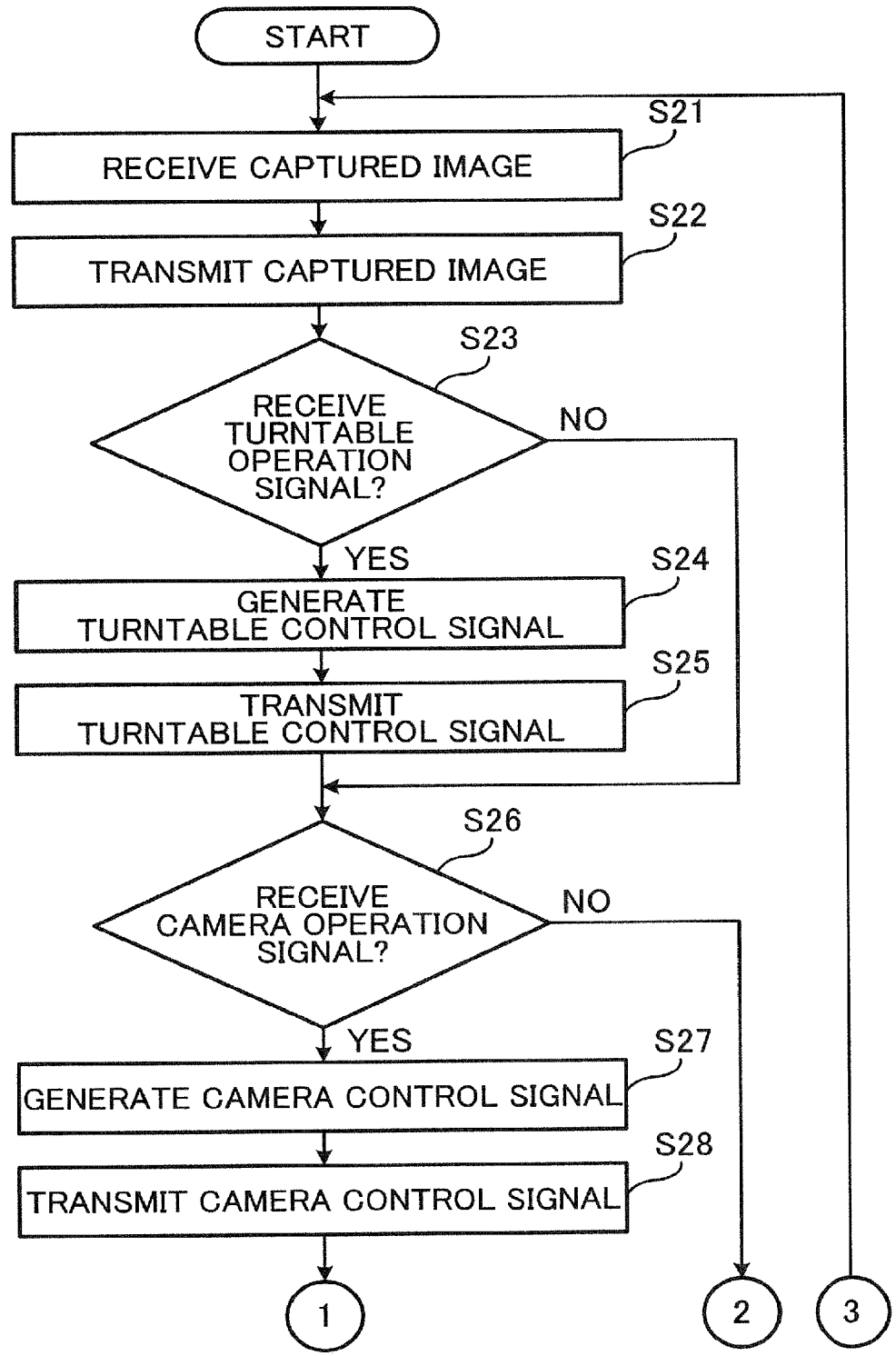
FIG. 13 is a first flowchart for explaining processing in which a main control device always displays the tip of the tip attachment in the field of view of the imaging device in the present embodiment.
Figure 14:
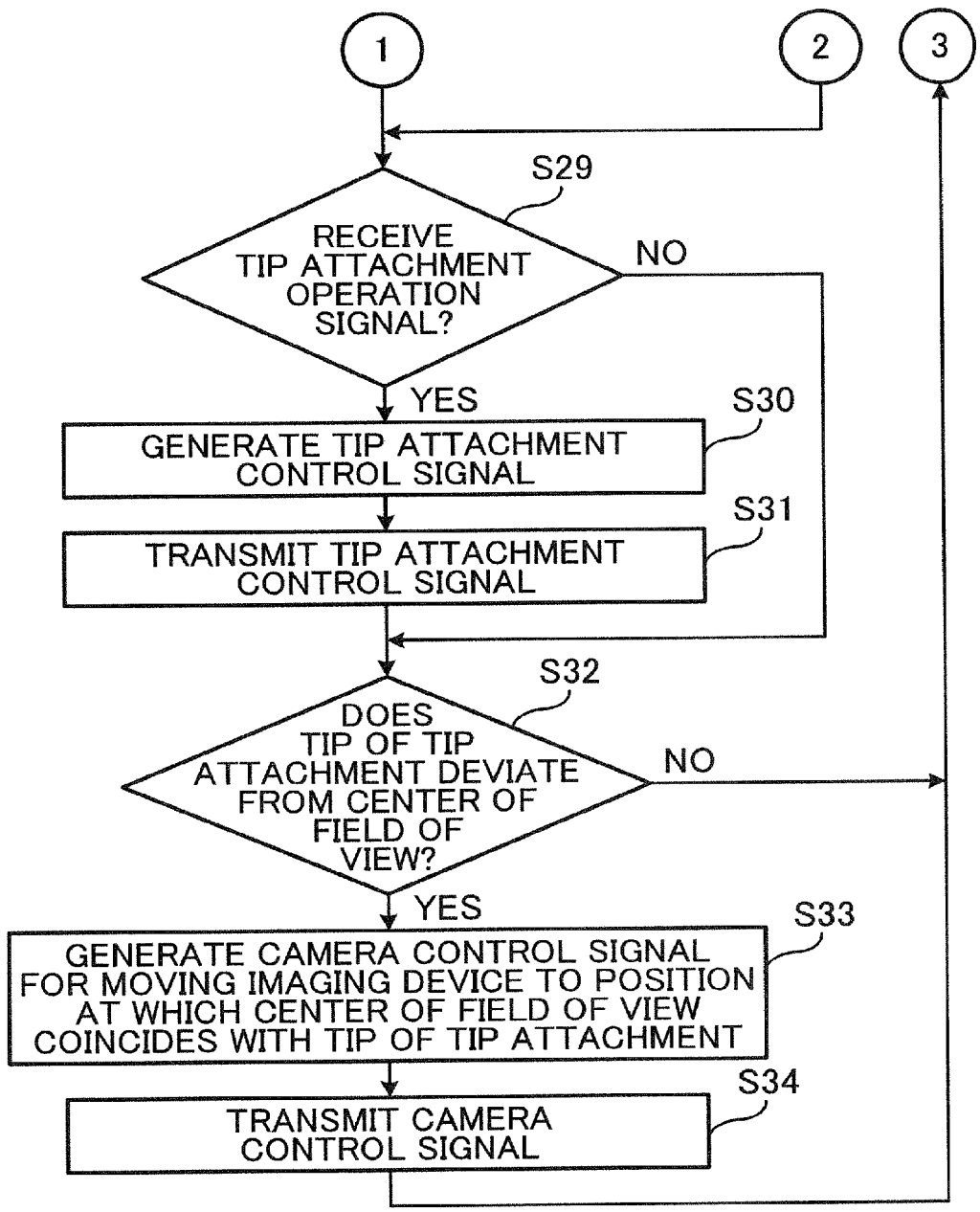
FIG. 14 is a second flowchart for explaining processing in which the main control device always displays the tip of the tip attachment in the field of view of the imaging device in the present embodiment.

FIG. 13 is a first flowchart for explaining the processing in which the main control device always displays the tip of the tip attachment in the field of view of the imaging device in the present embodiment, and FIG. 14 is a second flowchart for explaining the processing in which the main control device always displays the tip of the tip attachment in the field of view of the imaging device in the present embodiment.

First, in Step S21, the receiving unit 88 of the main control device 108 receives the captured image transmitted by the imaging device 13.

Next, in Step S22, the transmission unit 90 transmits the captured image received by the receiving unit 88 to the monitor 104. The receiving unit 41 of the monitor 104 receives the captured image transmitted by the main control device 108. Then, the image display unit 42 of the monitor 104 displays the captured image received by the receiving unit 41.

Next, in Step S23, the turntable control unit 82 of the main control device 108 determines whether or not the turntable operation signal transmitted by the dismantling object movement operation device 102 is received. Here, if it is determined that the turntable operation signal is not received (NO in Step S23), the processing moves to Step S26.

On the other hand, in a case where it is determined that the turntable operation signal is received (YES in Step S23), the turntable control unit 82 of the main control device 108 generates the turntable control signal for moving the turntable 11 based on the turntable operation signal in Step S24.

Next, in Step S25, the transmission unit 83 transmits the turntable control signal generated by the turntable control unit 82 to the dismantling object moving device 105. The receiving unit 51 of the dismantling object moving device 105 receives the turntable control signal transmitted by the main control device 108. Then, the drive unit 52 of the dismantling object moving device 105 moves the turntable 11 based on the turntable control signal received by the receiving unit 51.

Next, in Step S26, the camera control unit 89 determines whether or not the camera operation signal transmitted by the imaging operation device 107 is received. Here, in a case where it is determined that the camera operation signal is not received (NO in Step S26), the processing moves to Step S29.

On the other hand, in a case where it is determined that the camera operation signal is received (YES in Step S26), the camera control unit 89 generates the camera control signal for moving the imaging device 13 based on the camera operation signal received by the receiving unit 87 in Step S27.

Next, in Step S28, the transmission unit 90 transmits the camera control signal generated by the camera control unit 89 to the imaging device 13. The receiving unit 132 of the imaging device 13 receives the camera control signal transmitted by the main control device 108. Then, the drive unit 131 of the imaging device 13 moves the imaging device 13 based on the camera control signal received by the receiving unit 132.

As described above, the operator moves the scrap automobile 2 to the center of the field of view of the imaging device 13 by moving at least one of the turntable 11 and the imaging device 13.

Figure 15:
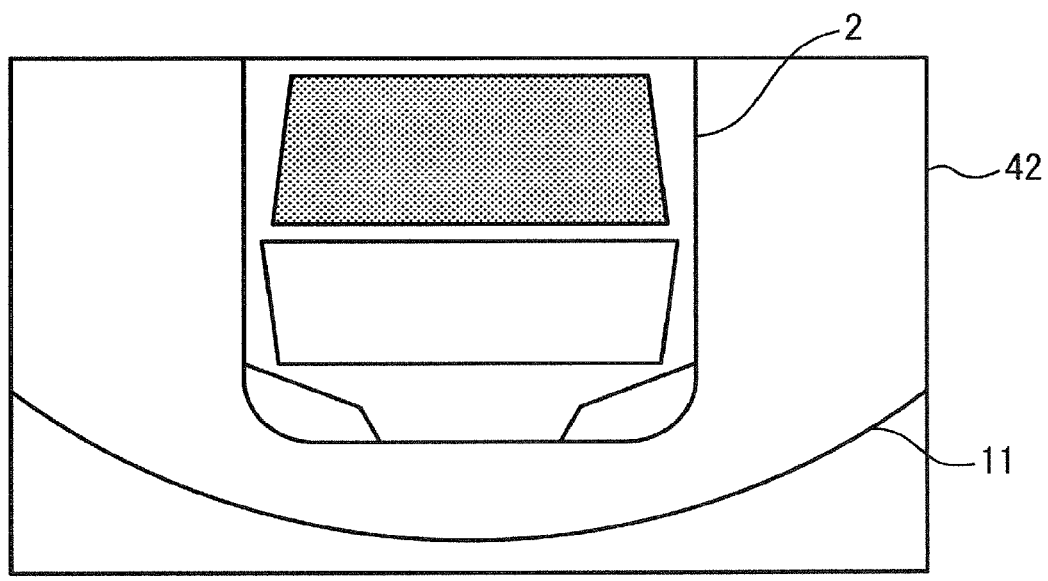
FIG. 15 is a diagram showing an example of a display screen displayed on the monitor when at least one of the turntable and the imaging device is moved in the present embodiment.

FIG. 15 is a diagram showing an example of a display screen displayed on the monitor when at least one of the turntable and the imaging device is moved in the present embodiment.

As shown in FIG. 15, as a result of movement of at least one of the turntable 11 and the imaging device 13, the scrap automobile 2 is displayed in the center of the display screen of the image display unit 42. At this time, the tip attachment 12e, which deviates from the field of view of the imaging device 13, is not displayed on the display screen. In this case, the operator operates the tip attachment 12e to move the tip of the tip attachment 12e into the field of view of the imaging device 13.

Returning to FIG. 14, next, in Step S29, the tip ATT control unit 85 determines whether or not the tip attachment operation signal transmitted by the dismantling operation device 103 is received. Here, if it is determined that the tip attachment operation signal is not received (NO in Step S29), the process moves to Step S32.

On the other hand, in a case where it is determined that the tip attachment operation signal is received (YES in Step S29), the tip ATT control unit 85 generates the tip attachment control signal for operating the tip attachment 12e based on the tip attachment operation signal received by the receiving unit 84 in Step S30.

Next, in Step S31, the transmission unit 86 transmits the tip attachment control signal generated by the tip ATT control unit 85 to the dismantling machine 12. The receiving unit 61 of the dismantling machine 12 receives the tip attachment control signal transmitted by the main control device 108. Then, the drive unit 62 of the dismantling machine 12 operates the tip attachment 12e based on the tip attachment control signal received by the receiving unit 61.

As shown in FIG. 15, in a case where the tip attachment 12e deviates from the field of view of the imaging device 13 and is not displayed on the display screen, the tip ATT operation unit 31 of the dismantling operation device 103 receives the movement operation for moving the tip of the tip attachment 12e into the field of view of the imaging device 13. The transmission unit 33 of the dismantling operation device 103 transmits, to the main control device 108, the tip attachment operation signal indicating the movement operation of the tip attachment 12e input by the tip ATT operation unit 31. The receiving unit 84 receives the tip attachment operation signal for moving the tip of the tip attachment 12e into the field of view of the imaging device 13.

The tip ATT control unit 85 generates the tip attachment control signal for moving the tip of the tip attachment 12e into the field of view of the imaging device 13 based on the received tip attachment operation signal. The transmission unit 86 transmits the tip attachment control signal generated by the tip ATT control unit 85 to the dismantling machine 12. The receiving unit 61 of the dismantling machine 12 receives the tip attachment control signal transmitted by the main control device 108. Then, the drive unit 62 of the dismantling machine 12 moves the tip of the tip attachment 12e into the field of view of the imaging device 13 based on the tip attachment control signal received by the receiving unit 61.

Figure 16:
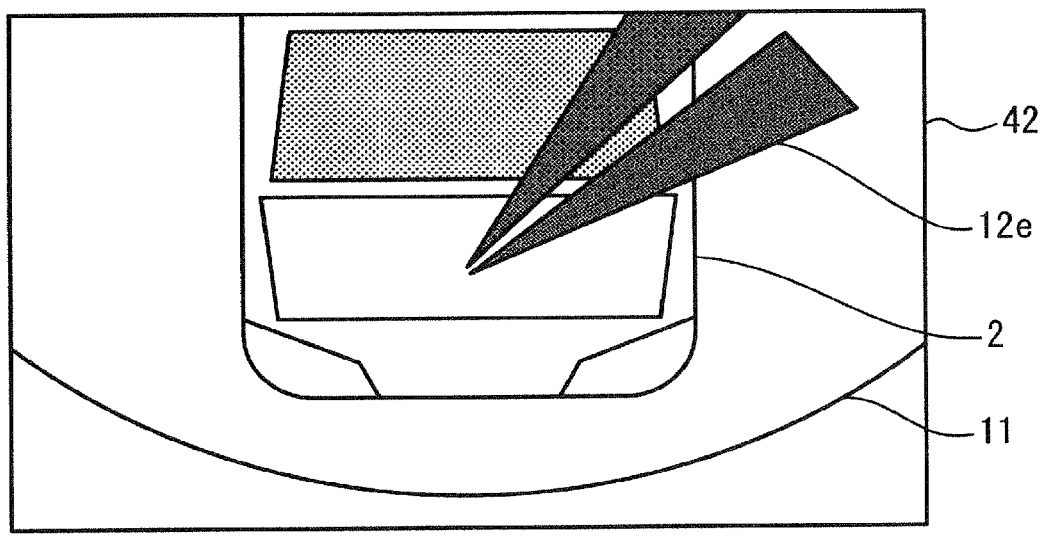
FIG. 16 is a diagram showing an example of a display screen displayed on the monitor when the tip of the tip attachment is moved into the field of view of the imaging device in the present embodiment.

FIG. 16 is a diagram showing an example of a display screen displayed on the monitor when the tip of the tip attachment is moved into the field of view of the imaging device in the present embodiment.

As shown in FIG. 16, as a result of the movement of the tip of the tip attachment 12e to the center of the field of view of the imaging device 13, the tip of the tip attachment 12e is displayed in the center of the display screen of the image display unit 42.

Note that, after the processing in Step S31, or in a case where it is determined that the tip attachment operation signal is not received in Step S29, the tip ATT control unit 85 may determine whether or not the tip of the tip attachment 12e exists in the field of view of the imaging device 13. In a case where it is determined that the tip of the tip attachment 12e exists in the field of view of the imaging device 13, the processing may move to Step S32. On the other hand, in a case where it is determined that the tip of the tip attachment 12e does not exist in the field of view of the imaging device 13, the processing may return to Step S29. Then, the processing of Steps S29 to S31 may be repeated until the tip attachment operation signal for moving the tip of the tip attachment 12e into the field of view of the imaging device 13 is received.

Figure 17:
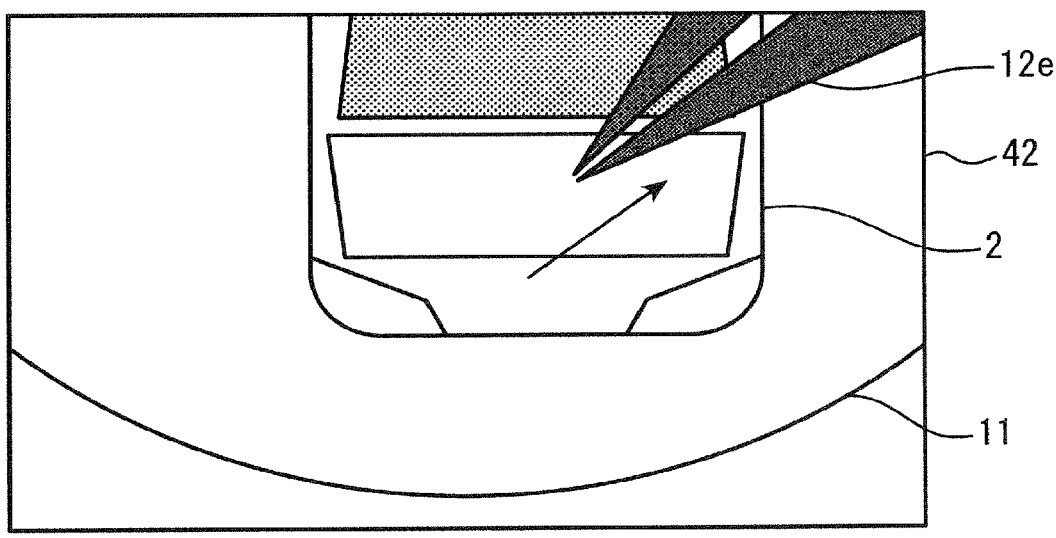
FIG. 17 is a diagram showing an example of a display screen displayed on the monitor when a scrap automobile is dismantled with the tip attachment in the present embodiment.

FIG. 17 is a diagram showing an example of the display screen displayed on the monitor when a scrap automobile is dismantled with the tip attachment in the present embodiment.

The operator dismantles the scrap automobile 2 by operating the tip attachment 12e. At this time, in a case where the tip attachment 12e is moved while gripping the scrap automobile 2, the tip of the tip attachment 12e deviates from the center of the field of view of the imaging device 13.

As shown in FIG. 17, as a result of the tip of the tip attachment 12e moving in the direction of the arrow and deviating from the center of the field of view of the imaging device 13, the tip of the tip attachment 12e is displayed out of the center of the display screen of the image display unit 42.

Returning to FIG. 14, next, in Step S32, the camera control unit 89 determines whether or not the tip of the tip attachment 12e deviates from the center of the field of view of the imaging device 13. The camera control unit 89 can identify at which position on the captured image the tip of the tip attachment 12e exists by image recognition. Note that the camera control unit 89 may determine whether or not the tip of the tip attachment 12e deviates from the center point of the field of view of the imaging device 13, or whether or not the tip of the tip attachment 12e deviates from a predetermined region including the center point of the field of view of the imaging device 13.

Here, in a case where it is determined that the tip of the tip attachment 12e does not deviate from the center of the field of view of the imaging device 13 (NO in Step S32), the processing returns to Step S21.

On the other hand, in a case where it is determined that the tip of the tip attachment 12e deviates from the center of the field of view of the imaging device 13 (YES in Step S32), in Step S33, the camera control unit 89 generates the camera control signal for moving the imaging device 13 to a position where the center of the field of view of the imaging device 13 coincides with the tip of the tip attachment 12e.

Next, in Step S34, the transmission unit 90 transmits the camera control signal generated by the camera control unit 89 to the imaging device 13. The receiving unit 132 of the imaging device 13 receives the camera control signal transmitted by the main control device 108. Then, the drive unit 131 of the imaging device 13 moves the imaging device 13 based on the camera control signal received by the receiving unit 132. In this manner, the tip of the tip attachment 12e is displayed in the center of the captured image of the imaging device 13.

Figure 18:
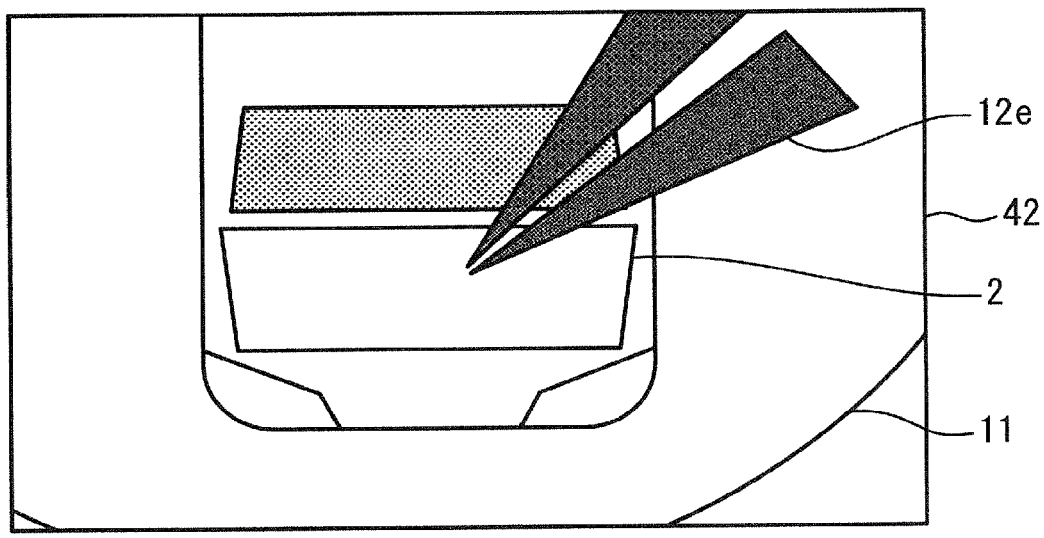
FIG. 18 is a diagram showing an example of a display screen displayed on the monitor when the imaging device is moved to a position where the center of the field of view of the imaging device and the tip of the tip attachment coincide with each other in the present embodiment.

FIG. 18 is a diagram showing an example of a display screen displayed on the monitor when the imaging device is moved to a position where the center of the field of view of the imaging device and the tip of the tip attachment coincide with each other in the present embodiment.

As shown in FIG. 18, as a result of movement of the imaging device 13 to a position where the center of the field of view of the imaging device 13 and the tip of the tip attachment 12e coincide with each other, the tip of the tip attachment 12e is displayed in the center of the display screen of the image display unit 42. At this time, the imaging device 13 automatically moves. Therefore, the operator can more easily visually recognize the working part of the scrap automobile 2, and can efficiently perform the dismantling work.

Figure 19:
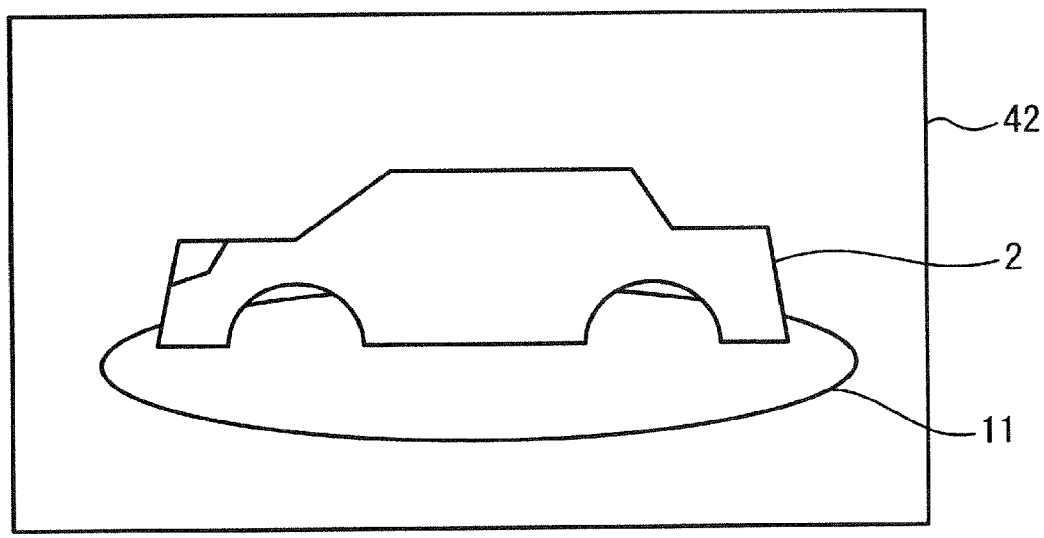
FIG. 19 is a diagram showing an example of a display screen displayed on the monitor when another working part of a scrap automobile is dismantled in the present embodiment.

FIG. 19 is a diagram showing an example of a display screen displayed on the monitor when another working part of a scrap automobile is dismantled in the present embodiment.

When finishing dismantling the working part of the scrap automobile as seen from the current field of view of the imaging device 13, the operator moves at least one of the turntable 11 and the imaging device 13 and dismantles another working part of the scrap automobile as seen from another field of view of the imaging device 13.

As shown in FIG. 19, as a result of movement of at least one of the turntable 11 and the imaging device 13, an image of the scrap automobile 2 captured from another viewpoint position is displayed in the center of the display screen of the image display unit 42.

Next, an example of the display screen displayed on the image display unit 42 of the monitor 104 will be described.

Figure 20:
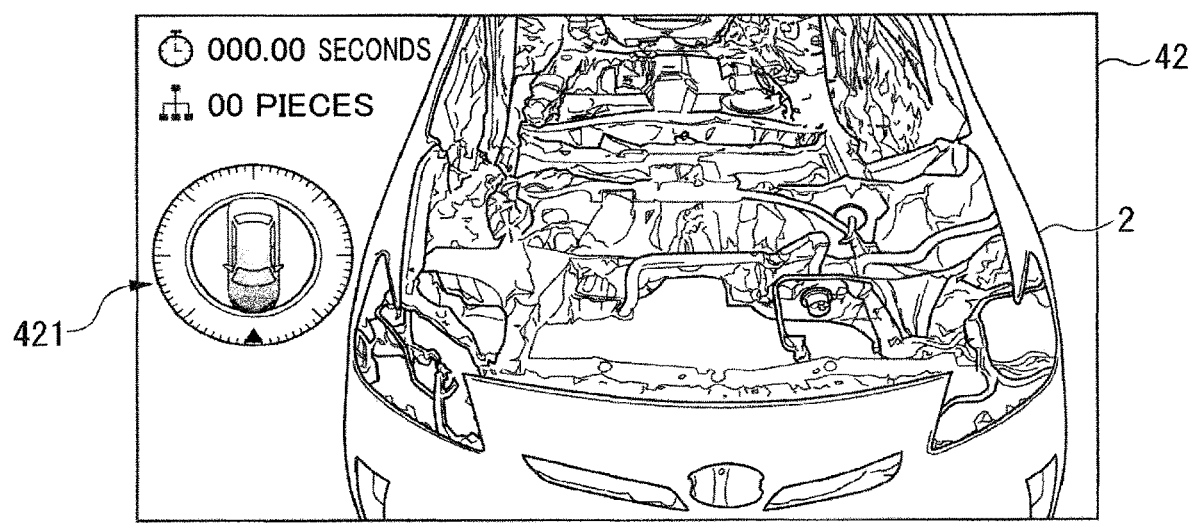
FIG. 20 is a diagram showing an example of a display screen, in which a captured image obtained by imaging of a scrap automobile and an auxiliary image indicating an imaging direction of the imaging device with respect to the scrap automobile are displayed in the present embodiment.

FIG. 20 is a diagram showing an example of a display screen, in which a captured image obtained by imaging of a scrap automobile and an auxiliary image indicating an imaging direction of the imaging device with respect to the scrap automobile are displayed in the present embodiment.

The camera control unit 89 of the main control device 108 generates an auxiliary image 421 showing how much the imaging direction of the imaging device 13 changes based on a state in which the front of the scrap automobile 2 and the front of the dismantling machine 12 are facing each other. In this case, the camera control unit 89 stores the position of the turntable 11 and the position of the imaging device 13 when the front of the scrap automobile 2 and the front of the dismantling machine 12 face each other as reference positions in a storage unit (not shown). Then, the camera control unit 89 generates the auxiliary image 421 based on the current position of the turntable 11 with respect to the reference position and the current position of the imaging device 13 with respect to the reference position. The camera control unit 89 superimposes the auxiliary image 421 on the captured image captured by the imaging device 13. The transmission unit 90 transmits the captured image on which the auxiliary image 421 is superimposed to the monitor 104.

The image display unit 42 of the monitor 104 displays the auxiliary image 421 together with the captured image. By checking the auxiliary image 421, the operator can visually recognize how much the position from which the captured image being displayed is captured is tilted from the state where the front of the scrap automobile 2 and the front of the dismantling machine 12 are facing each other. As a result, the operator can easily determine how to move the turntable 11 and the imaging device 13 when disassembling a desired working part, and the work efficiency of the dismantling work can be improved.

Next, an example of the captured image captured from a viewpoint position overlooking the scrap automobile 2 and the dismantling machine 12 will be described.

FIG. 21 is a diagram showing an example of a captured image captured from a viewpoint position overlooking the scrap automobile and the dismantling machine on the turntable in the present embodiment.

The camera control unit 89 of the main control device 108 may generate a camera control signal for moving the imaging device 13 to a viewpoint position overlooking the scrap automobile 2 and the dismantling machine 12 in a case where the tip attachment 12e deviates from the field of view of the imaging device 13. At this time, the overlooking viewpoint position may be determined in advance. The imaging device 13 automatically moves to a viewpoint position overlooking the scrap automobile 2 and the dismantling machine 12 according to the camera control signal.

As shown in FIG. 21, the image display unit 42 of the monitor 104 displays a captured image overlooking the scrap automobile 2 and the dismantling machine 12. The monitor 104 presents to the operator operating the dismantling machine 12 an image showing the relationship between the position and posture of the tip attachment 12e (dismantling unit) and the position and posture of the scrap automobile 2 (object to be dismantled). In this way, the scrap automobile 2 and the dismantling machine 12 are displayed on the monitor 104 at the same time. Therefore, even if the tip attachment 12e deviates from the field of view of the imaging device 13, the operator can easily recognize where the tip attachment 12e exists.

Note that the camera control unit 89 moves the imaging device 13 to a viewpoint position overlooking the scrap automobile 2 and the dismantling machine 12 in a case where the tip attachment 12e deviates from the field of view of the imaging device 13. However, the present disclosure is not particularly limited to this. The dismantling system may be provided with another imaging device different from the imaging device 13 at a viewpoint position overlooking the scrap automobile 2 and the dismantling machine 12. In a case where the tip attachment 12e deviates from the field of view of the imaging device 13, the camera control unit 89 may switch the captured image displayed on the monitor 104 to a captured image acquired from another imaging device disposed at an overlooking viewpoint position.

Summary of Embodiment

The technical features of the present embodiment are summarized as described below.

A dismantling system according to an aspect of the present invention is a dismantling system that dismantles an object to be dismantled, and includes a dismantling machine including a dismantling unit for dismantling the object to be dismantled, a viewpoint providing device that provides a field of view from a second viewpoint position for visually recognizing the object to be dismantled, which is different from a first viewpoint position of an operator, and a dismantling operation device that receives operation by the operator of the dismantling unit for dismantling the object to be dismantled with respect to the field of view provided by the viewpoint providing device.

According to this configuration, the working part of the object to be dismantled that cannot be seen by the operator is confirmed by the field of view from the second viewpoint position for visually recognizing the object to be dismantled, which is different from the first viewpoint position of the operator. Therefore, the position or posture of the dismantling unit with respect to the object to be dismantled can be maintained at an appropriate position or posture that facilitates work for the operator, and the visibility of a working part of the object to be dismantled to the operator can be improved.

Further, in the dismantling system described above, the viewpoint providing device may include an imaging device that captures an image of the object to be dismantled, and a display device that displays an image captured by the imaging device.

According to this configuration, an image of the object to be dismantled is captured and the captured image is displayed, so that the operator can operate the dismantling unit while viewing the displayed image.

Further, in the dismantling system described above, the display device may present an image showing a relationship between a position and posture of the dismantling unit and a position and posture of the object to be dismantled to the operator who operates the dismantling unit.

According to this configuration, the operator can determine the working part of the object to be dismantled while looking at the image showing the relationship between the position and posture of the dismantling unit and the position and posture of the object to be dismantled, and can dismantle the object to be dismantled more efficiently.

Further, the dismantling system described above may further include a movement control device that moves the imaging device so that a tip of the dismantling unit is displayed in a center of the field of view in a case where a tip of the dismantling unit deviates from the center of the field of view.

According to this configuration, even if the tip of the dismantling unit deviates from the center of the field of view, the tip of the dismantling unit is always displayed in the center of the field of view, so that the working part of the object to be dismantled can be more easily visually recognized and the work efficiency of the operator can be improved.

Further, the dismantling system described above may further include a dismantling object moving device that moves the object to be dismantled, and a dismantling object movement operation device that receives operation by the operator of the dismantling object moving device.

According to this configuration, the operation by the operator of the dismantling object moving device for moving the object to be dismantled can be received, so that the object to be dismantled can be moved to a position at which the object to be dismantled can be more easily visually recognized and more easily dismantled.

Further, in the dismantling system described above, the dismantling object moving device may include a mounting table on which the object to be dismantled is placed, and a rotation unit that rotates the mounting table around a predetermined axis.

According to this configuration, the mounting table on which the object to be dismantled is placed rotates around a predetermined axis, so that the object to be dismantled can be moved to a position at which the object to be dismantled can be more easily visually recognized and more easily dismantled.

Further, in the dismantling system described above, the dismantling object moving device may include a fixing portion that fixes the object to be dismantled to the mounting table.

According to this configuration, the object to be dismantled is fixed to the mounting table, so that the object to be dismantled does not move during the dismantling work, and the work efficiency of the operator can be improved.

Further, in the dismantling system described above, the dismantling object movement operation device may include a rotation operation receiving unit that receives operation of the rotation unit by the operator.

According to this configuration, the operation by the operator of the rotation unit can be received, so that the object to be dismantled can be moved to a position at which the object to be dismantled can be more easily visually recognized and more easily dismantled.

Further, in the dismantling system described above, the dismantling object moving device may include a mounting table on which the object to be dismantled is placed and a translational movement unit that translates the mounting table.

According to this configuration, the mounting table on which the object to be dismantled is placed is translated, so that the object to be dismantled can be moved to a position at which the object to be dismantled can be more easily visually recognized and more easily dismantled.

Further, in the dismantling system described above, the dismantling object moving device may include a mounting table on which the object to be dismantled is placed and a tilting unit that tilts the mounting table.

According to this configuration, the mounting table on which the object to be dismantled is placed is tilted, so that the object to be dismantled can be moved to a position at which the object to be dismantled can be more easily visually recognized and more easily dismantled.

Further, in the dismantling system described above, the dismantling object moving device may include a mounting table on which the object to be dismantled is placed and a revolving unit that moves the mounting table along a circle centered on the dismantling machine.

According to this configuration, the mounting table on which the object to be dismantled is placed moves along a circle centered on the dismantling machine, so that the object to be dismantled can be moved to a position at which the object to be dismantled can be more easily visually recognized and more easily dismantled.

Note that the specific embodiment or example made in the section of Description of Embodiments merely clarifies the technical content of the present invention, should not be construed in a narrow sense by being limited to such a specific example, and can be modified and implemented in various ways within the scope of the spirit of the present invention and the claims.

The invention claimed is:
1. A dismantling system that dismantles an object to be dismantled, the dismantling system comprising:
   a dismantling machine including a dismantling unit for dismantling the object to be dismantled;
   a viewpoint providing device that provides a field of view from a second viewpoint position for visually recognizing the object to be dismantled, which is different from a first viewpoint position of an operator;
   a dismantling operation device that receives operation by the operator of the dismantling unit for dismantling the object to be dismantled with respect to the field of view provided by the viewpoint providing device;
   a dismantling object moving device that moves the object to be dismantled; and a dismantling object movement operation device that receives operation by the operator of the dismantling object moving device, wherein the viewpoint providing device includes an imaging device that captures an image of the object to be dismantled, and a display device that displays an image captured by the imaging device, wherein the imaging device is a single omnidirectional image capturing device, which can capture an image of the object to be dismantled from a plurality of viewpoints surrounding the object to be dismantled, or the viewpoint providing device includes a plurality of imaging devices disposed at a plurality of spatial positions which enable that a free viewpoint image of the object to be dismantled can be obtained from a plurality of view points surrounding the object to be dismantled, wherein the dismantling object moving device includes a mounting table on which the object to be dismantled is placed and a revolving unit that moves the mounting table along a circle centered on the dismantling machine.

2. The dismantling system according to claim 1, wherein the display device presents an image showing a relationship between a position and posture of the dismantling unit and a position and posture of the object to be dismantled to the operator who operates the dismantling unit.

3. The dismantling system according to claim 1, further comprising a movement control device that moves the imaging device so that a tip of the dismantling unit is displayed in a center of the field of view in a case where a tip of the dismantling unit deviates from the center of the field of view.

4. The dismantling system according to claim 1, wherein the dismantling object moving device further includes a rotation unit that rotates the mounting table around a predetermined axis.

5. The dismantling system according to claim 4, wherein the dismantling object moving device further includes a fixing portion that fixes the object to be dismantled to the mounting table.

6. The dismantling system according to claim 4, wherein the dismantling object movement operation device includes a rotation operation receiving unit that receives operation of the rotation unit by the operator.

7. The dismantling system according to claim 1, wherein the dismantling object moving device further includes a translational movement unit that translates the mounting table.

8. The dismantling system according to claim 1, wherein the dismantling object moving device further includes a tilting unit that tilts the mounting table.

* * * * *